United States Patent
Chen et al.

(10) Patent No.: US 9,541,734 B2
(45) Date of Patent: Jan. 10, 2017

(54) MOBILE DEVICE AND OPTICAL IMAGING LENS THEREOF

(71) Applicant: GeniuS Electronic Optical Co., Ltd., Taichung (TW)

(72) Inventors: Feng Chen, Xiamen (CN); Long Ye, Xiamen (CN); Yan Bin Chen, Xiamen (CN)

(73) Assignee: GENIUS ELECTRONIC OPTICAL CO., LTD. (TW)

(*) Notice: Subject to any disclaimer, the term of this patent is extended or adjusted under 35 U.S.C. 154(b) by 2 days.

(21) Appl. No.: 14/599,195

(22) Filed: Jan. 16, 2015

(65) Prior Publication Data

US 2016/0116708 A1  Apr. 28, 2016

(30) Foreign Application Priority Data

Oct. 24, 2014  (CN) .......................... 2014 1 0578074

(51) Int. Cl.
*G02B 13/18* (2006.01)
*G02B 3/02* (2006.01)
*G02B 9/34* (2006.01)
*G02B 13/00* (2006.01)

(52) U.S. Cl.
CPC .............. *G02B 13/004* (2013.01); *G02B 9/34* (2013.01)

(58) Field of Classification Search
CPC .................................. G02B 9/34; G02B 13/18
USPC ......................................... 359/715, 771, 781
See application file for complete search history.

(56) References Cited

U.S. PATENT DOCUMENTS

| 7,295,386 | B2 | 11/2007 | Taniyama |
| 7,443,611 | B2 | 10/2008 | Shinohara |
| 8,014,080 | B1 * | 9/2011 | Chen .................. G02B 9/34 359/644 |
| 2014/0085712 | A1 | 3/2014 | Tsai et al. |

FOREIGN PATENT DOCUMENTS

TW    201109712    3/2011

* cited by examiner

*Primary Examiner* — Alicia M Harrington
(74) *Attorney, Agent, or Firm* — Baker & McKenzie LLP

(57) ABSTRACT

Present embodiments provide for a mobile device and an optical imaging lens thereof. The optical imaging lens comprises an aperture stop and four lens elements positioned sequentially from an object side to an image side. Through controlling the convex or concave shape of the surfaces of the lens elements and designing parameters satisfying at least one inequality, the optical imaging lens shows better optical characteristics and the total length of the optical imaging lens is shortened.

19 Claims, 28 Drawing Sheets

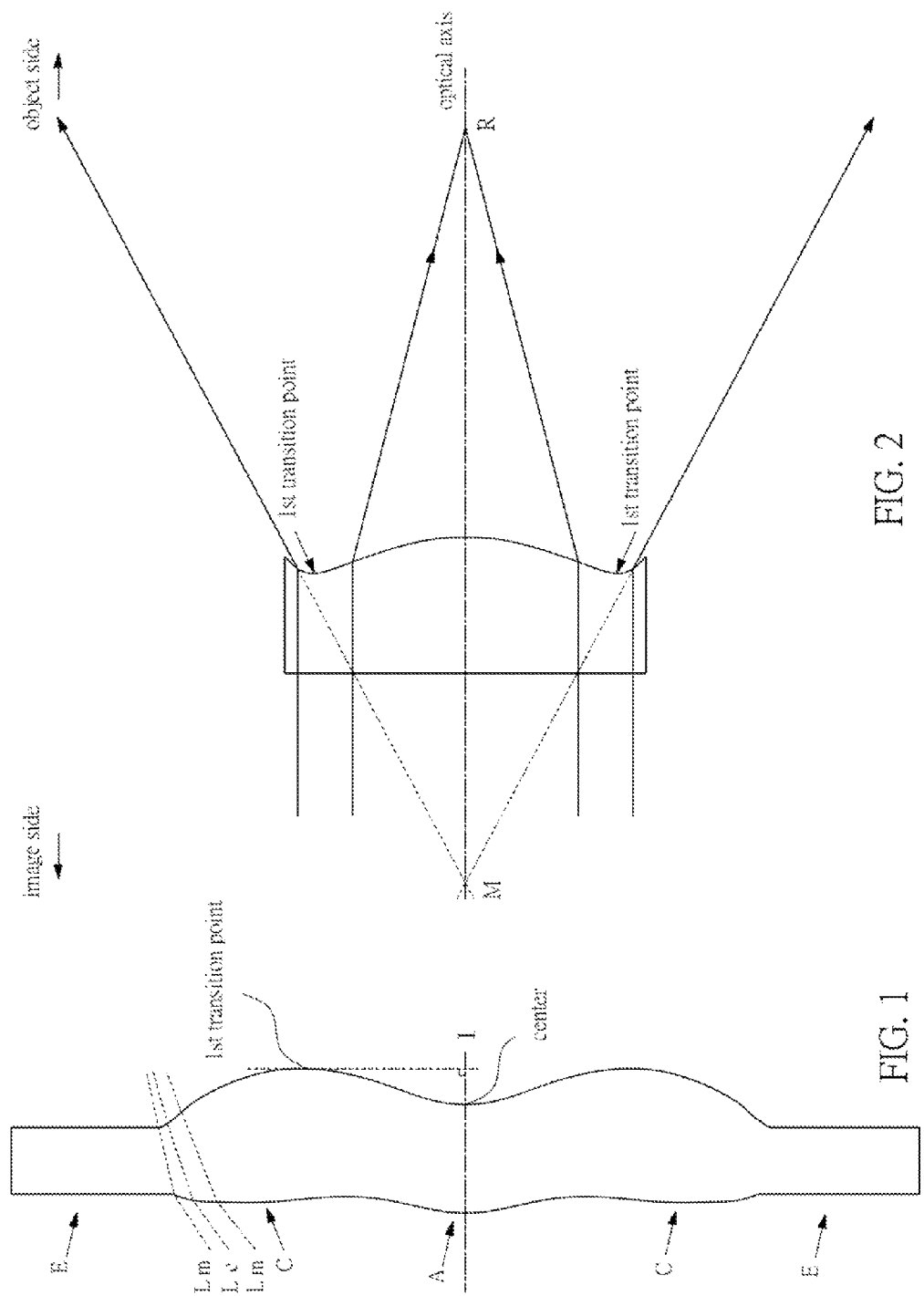

| f(Focus)= 1.383mm, HFOV(Half angular field of view)= 48.00deg., System length=3.0638mm, Image height= 1.596mm, Fno=2.2 ||||||||
| Surface # | | Radius | Thickness | Refractive index | Abbe number | Focus | Material |
|---|---|---|---|---|---|---|---|
| - | Object | ∞ | 300.0000 | | | | |
| 111 | 1st lens element | 16.7543 | 0.2761_T1 | 1.535_n1 | 55.712_v1 | -3.355_f1 | plastic |
| 112 | | 1.6169 | 0.2921_G12 | | | | |
| 121 | 2nd lens lement | 0.8675 | 0.3729_T2 | 1.535_n2 | 55.712_v2 | 1.559_f2 | plastic |
| 122 | | -20.0000 | 0.0286_G23-TA | | | | |
| 100 | Aperture stop | ∞ | 0.2466_TA | | | | |
| 131 | 3rd lens element | -3.0000 | 0.2481_T3 | 1.643_n3 | 22.437_v3 | -5.932_f3 | plastic |
| 132 | | -14.1113 | 0.1420_G34 | | | | |
| 141 | 4th lens element | 0.8010 | 0.5858_T4 | 1.531_n4 | 55.744_v4 | 1.756_f4 | plastic |
| 142 | | 4.1501 | 0.3329_G4F | | | | |
| 151 | IR cut filter | ∞ | 0.2100_TF | | | | glass |
| 152 | | ∞ | 0.3286_GFP | | | | |
| 160 | Image plane | ∞ | | | | | |

FIG. 8

| Aspherical parameters | | | | |
|---|---|---|---|---|
| Surface # | 111 | 112 | 121 | 122 |
| K | 0.0000E+00 | 0.0000E+00 | -9.5653E+00 | 0.0000E+00 |
| $a_2$ | 0.0000E+00 | 0.0000E+00 | 0.0000E+00 | 0.0000E+00 |
| $a_4$ | 2.1479E-02 | -2.2331E-01 | 1.2222E+00 | 5.2052E-01 |
| $a_6$ | 7.5860E-02 | 1.3468E+00 | -5.2825E+00 | -1.2741E+01 |
| $a_8$ | -4.9076E-02 | -4.2824E+00 | 1.0110E+01 | 8.6190E+01 |
| $a_{10}$ | 1.2089E-03 | 8.7501E+00 | -9.5640E+00 | -2.9851E+02 |
| $a_{12}$ | 8.4338E-03 | -1.1528E+01 | -6.7957E+00 | 5.2074E+02 |
| $a_{14}$ | 1.3960E-02 | 1.1716E+01 | 2.9203E+01 | -4.3060E+02 |
| $a_{16}$ | -1.7746E-02 | -7.4223E+00 | -1.7565E+01 | 5.1132E+02 |
| Surface # | 131 | 132 | 141 | 142 |
| K | 3.1615E+01 | 5.6328E+02 | -7.8997E+00 | 0.0000E+00 |
| $a_2$ | 0.0000E+00 | 0.0000E+00 | 0.0000E+00 | 0.0000E+00 |
| $a_4$ | -2.8342E-01 | -1.3582E+00 | -2.1767E-02 | 2.7878E-01 |
| $a_6$ | 1.5708E+00 | 3.7336E+00 | -2.1583E-01 | -6.5193E-01 |
| $a_8$ | -1.0705E+01 | -3.1972E+00 | 1.2582E-01 | 5.2468E-01 |
| $a_{10}$ | 8.3225E+01 | 1.6047E+00 | 3.1673E-02 | -1.9680E-01 |
| $a_{12}$ | -2.4011E+01 | 1.0632E+00 | 2.5684E-02 | 2.0841E-02 |
| $a_{14}$ | -1.4109E+03 | 1.3384E+01 | -1.0214E-01 | -3.2100E-03 |
| $a_{16}$ | 3.0884E+03 | -7.2987E+00 | 3.3558E-02 | 2.6757E-03 |

FIG. 9

| f(Focus)= 1.647mm, HFOV(Half angular field of view)= 43.00deg., System length=3.4926mm, Image height= 1.702mm, Fno=2.2 ||||||||
|---|---|---|---|---|---|---|---|
| Surface # | | Radius | Thickness | Refractive index | Abbe number | Focus | Material |
| - | Object | ∞ | 300.0000 | | | | |
| 211 | 1st lens element | 6.5339 | 0.5500_T1 | 1.535_n1 | 55.712_v1 | -3.414_f1 | plastic |
| 212 | | 1.3893 | 0.1543_G12 | | | | |
| 221 | 2nd lens element | 1.0095 | 0.3500_T2 | 1.535_n2 | 55.712_v2 | 1.826_f2 | plastic |
| 222 | | -30.0000 | 0.0355_G23 -TA | | | | |
| 200 | Aperture stop | ∞ | 0.1970_TA | | | | |
| 231 | 3rd lens element | -3.0000 | 0.3396_T3 | 1.643_n3 | 22.437_v3 | -6.139_f3 | plastic |
| 232 | | -12.7482 | 0.1339_G34 | | | | |
| 241 | 4th lens element | 0.8148 | 0.4985_T4 | 1.531_n4 | 55.744_v4 | 1.781_f4 | plastic |
| 242 | | 4.5337 | 0.4794_G4F | | | | |
| 251 | IR cut filter | ∞ | 0.2100_TF | | | | glass |
| 252 | | ∞ | 0.5444_GFP | | | | |
| 260 | Image plane | ∞ | | | | | |

FIG. 12

| Aspherical parameters | | | | |
|---|---|---|---|---|
| Surface # | 211 | 212 | 221 | 222 |
| K | 0.0000E+00 | 0.0000E+00 | -1.3464E+01 | 0.0000E+00 |
| $a_2$ | 0.0000E+00 | 0.0000E+00 | 0.0000E+00 | 0.0000E+00 |
| $a_4$ | 2.2405E-02 | -2.7151E-01 | 1.1376E+00 | 5.2208E-01 |
| $a_6$ | 6.3154E-02 | 1.4599E+00 | -5.3907E+00 | -1.2979E+01 |
| $a_8$ | -5.7372E-02 | -4.1411E+00 | 9.8821E+00 | 8.5706E+01 |
| $a_{10}$ | 2.5130E-03 | 8.4552E+00 | -1.0158E+01 | -2.9591E+02 |
| $a_{12}$ | 1.2275E-02 | -1.2383E+01 | -6.0691E+00 | 5.1318E+02 |
| $a_{14}$ | 1.8093E-02 | 1.1122E+01 | 2.2940E+01 | -4.4906E+02 |
| $a_{16}$ | -1.4561E-02 | -7.6980E+00 | -1.6979E+01 | 2.8779E+02 |
| Surface # | 231 | 232 | 241 | 242 |
| K | 3.1809E+01 | 4.0098E+02 | -8.2652E+00 | 0.0000E+00 |
| $a_2$ | 0.0000E+00 | 0.0000E+00 | 0.0000E+00 | 0.0000E+00 |
| $a_4$ | -4.6562E-01 | -1.5642E+00 | -2.3639E-02 | 2.6031E-01 |
| $a_6$ | 1.6980E+00 | 4.1613E+00 | -2.7098E-01 | -6.2862E-01 |
| $a_8$ | -6.5303E+00 | -4.7210E+00 | 1.5048E-01 | 4.9193E-01 |
| $a_{10}$ | 7.5696E+01 | 6.8434E-01 | 3.8574E-02 | -1.9889E-01 |
| $a_{12}$ | -2.1583E+01 | 2.1136E+00 | 3.9813E-02 | 4.2207E-02 |
| $a_{14}$ | -1.3683E+03 | 1.9933E+01 | -8.7654E-02 | -1.0543E-02 |
| $a_{16}$ | 3.5725E+03 | 2.2089E+00 | 3.0388E-02 | 3.0049E-03 |

FIG. 13

| f(Focus)= 1.670mm, HFOV(Half angular field of view)= 43.00deg., System length=3.434mm, Image height= 1.702mm, Fno=2.1 ||||||||
|---|---|---|---|---|---|---|---|
| Surface # | | Radius | Thickness | Refractive index | Abbe number | Focus | Material |
| - | Object | ∞ | 300.0000 | | | | |
| 311 | 1st lens element | 5.9747 | 0.2923_T1 | 1.535_n1 | 55.712_v1 | -3.586_f1 | plastic |
| 312 | | 1.4309 | 0.2617_G12 | | | | |
| 321 | 2nd lens lement | 1.0655 | 0.3938_T2 | 1.535_n2 | 55.712_v2 | 1.897_f2 | plastic |
| 322 | | -20.0000 | 0.0363_G23-TA | | | | |
| 300 | Aperture stop | ∞ | 0.2769_TA | | | | |
| 331 | 3rd lens element | -3.0000 | 0.3260_T3 | 1.643_n3 | 22.437_v3 | -6.191_f3 | plastic |
| 332 | | -12.4057 | 0.1208_G34 | | | | |
| 341 | 4th lens element | 0.8589 | 0.5204_T4 | 1.531_n4 | 55.744_v4 | 1.881_f4 | plastic |
| 342 | | 4.7376 | 0.5955_G4F | | | | |
| 351 | IR cut filter | ∞ | 0.2100_TF | | | | glass |
| 352 | | ∞ | 0.4005_GFP | | | | |
| 360 | Image plane | ∞ | | | | | |

FIG. 16

| Aspherical parameters | | | | |
|---|---|---|---|---|
| Surface # | 311 | 312 | 321 | 322 |
| K | 0.0000E+00 | 0.0000E+00 | -1.4257E+01 | 0.0000E+00 |
| $a_2$ | 0.0000E+00 | 0.0000E+00 | 0.0000E+00 | 0.0000E+00 |
| $a_4$ | 3.0408E-02 | -2.8186E-01 | 1.1282E+00 | 5.5059E-01 |
| $a_6$ | 4.5665E-02 | 1.2877E+00 | -5.2986E+00 | -1.3583E+01 |
| $a_8$ | -6.8046E-02 | -3.4933E+00 | 1.0048E+01 | 8.9553E+01 |
| $a_{10}$ | 9.5543E-02 | 6.4606E+00 | -9.8078E+00 | -3.0996E+02 |
| $a_{12}$ | -5.6353E-02 | -1.0332E+01 | -5.5529E+00 | 5.4379E+02 |
| $a_{14}$ | -5.8938E-03 | 1.2876E+01 | 2.1098E+01 | -4.5788E+02 |
| $a_{16}$ | 1.3580E-02 | -7.2474E+00 | -2.1861E+01 | 1.9958E+02 |
| Surface # | 331 | 332 | 341 | 342 |
| K | 2.8657E+01 | 3.3349E+02 | -8.8186E+00 | 0.0000E+00 |
| $a_2$ | 0.0000E+00 | 0.0000E+00 | 0.0000E+00 | 0.0000E+00 |
| $a_4$ | -6.4161E-01 | -1.6459E+00 | -4.1703E-02 | 2.8155E-01 |
| $a_6$ | 1.1164E+00 | 3.9193E+00 | -3.1806E-01 | -6.6130E-01 |
| $a_8$ | -4.7297E+00 | -4.1547E+00 | 2.5742E-01 | 5.2409E-01 |
| $a_{10}$ | 7.6992E+01 | 2.0464E-01 | -9.7476E-02 | -2.2744E-01 |
| $a_{12}$ | -2.7655E+01 | 1.1326E+00 | 1.2999E-01 | 5.6294E-02 |
| $a_{14}$ | -1.4743E+03 | 1.9512E+01 | -6.7805E-02 | -1.1234E-02 |
| $a_{16}$ | 3.5228E+03 | -1.0952E+01 | 6.6598E-04 | 2.2470E-03 |

FIG. 17

| f(Focus)= 1.355mm, HFOV(Half angular field of view)= 48.00deg., System length=2.9678mm, Image height= 1.507mm, Fno=2.1 | | | | | | | |
|---|---|---|---|---|---|---|---|
| Surface # | | Radius | Thickness | Refractive index | Abbe number | Focus | Material |
| - | Object | ∞ | 300.0000 | | | | |
| 411 | 1st lens element | 5.2138 | 0.1763_T1 | 1.535_n1 | 55.712_v1 | -3.462_f1 | plastic |
| 412 | | 1.3539 | 0.4457_G12 | | | | |
| 421 | 2nd lens lement | 0.8501 | 0.4342_T2 | 1.535_n2 | 55.712_v2 | 1.453_f2 | plastic |
| 422 | | -7.7463 | 0.0294_G23-TA | | | | |
| 400 | Aperture stop | ∞ | 0.2781_TA | | | | |
| 431 | 3rd lens element | -2.9950 | 0.2000_T3 | 1.643_n3 | 22.437_v3 | -4.669_f3 | plastic |
| 432 | | -305.0750 | 0.1122_G34 | | | | |
| 441 | 4th lens element | 0.7546 | 0.5988_T4 | 1.531_n4 | 55.744_v4 | 1.930_f4 | plastic |
| 442 | | 2.0512 | 0.4000_G4F | | | | |
| 451 | IR cut filter | ∞ | 0.2100_TF | | | | glass |
| 452 | | ∞ | 0.0830_GFP | | | | |
| 460 | Image plane | ∞ | | | | | |

FIG. 20

| Aspherical parameters | | | | |
|---|---|---|---|---|
| Surface # | 411 | 412 | 421 | 422 |
| K | 0.0000E+00 | 0.0000E+00 | -7.0662E+00 | 0.0000E+00 |
| $a_2$ | 0.0000E+00 | 0.0000E+00 | 0.0000E+00 | 0.0000E+00 |
| $a_4$ | -6.1939E-02 | -3.0849E-01 | 1.3126E+00 | 6.7734E-01 |
| $a_6$ | 1.0840E-01 | 1.4770E+00 | -4.2863E+00 | -1.1808E+01 |
| $a_8$ | -7.7938E-02 | -4.2952E+00 | 5.2251E+00 | 8.4453E+01 |
| $a_{10}$ | 1.3755E-02 | 7.7565E+00 | 1.1031E+01 | -3.0706E+02 |
| $a_{12}$ | -1.2380E-02 | -1.0411E+01 | -4.0536E+01 | 4.9365E+02 |
| $a_{14}$ | 4.2506E-02 | 1.0171E+01 | -1.7559E+01 | -2.8139E+02 |
| $a_{16}$ | -2.3675E-02 | -4.7564E+00 | 1.1388E+02 | -1.4363E+01 |
| Surface # | 431 | 432 | 441 | 442 |
| K | 2.2677E+01 | 2.7714E+05 | -8.2788E+00 | 0.0000E+00 |
| $a_2$ | 0.0000E+00 | 0.0000E+00 | 0.0000E+00 | 0.0000E+00 |
| $a_4$ | -3.1892E-01 | -1.9275E+00 | -2.0476E-01 | 1.9581E-01 |
| $a_6$ | 1.2043E+00 | 6.0379E+00 | -3.0837E-01 | -9.0697E-01 |
| $a_8$ | -1.2323E+01 | -3.1645E+00 | 6.3743E-01 | 1.0019E+00 |
| $a_{10}$ | 1.1062E+02 | -1.7051E+01 | 2.7904E-01 | -4.2878E-01 |
| $a_{12}$ | -1.1330E+02 | 6.3840E+01 | -4.8630E-01 | -4.4353E-03 |
| $a_{14}$ | -1.5871E+03 | -1.4155E+02 | -1.3544E+00 | 3.3954E-02 |
| $a_{16}$ | 3.3760E+03 | 1.2576E+02 | 1.2999E+00 | -8.1368E-04 |

FIG. 21

| f(Focus)= 1.755mm, HFOV(Half angular field of view)= 46.00deg., System length=3.4949mm, Image height= 1.770mm, Fno=2.0 |||||||
|---|---|---|---|---|---|---|---|
| Surface # | | Radius | Thickness | Refractive index | Abbe number | Focus | Material |
| - | Object | ∞ | 300.0000 | | | | |
| 511 | 1st lens element | 4.7833 | 0.2909_T1 | 1.535_n1 | 55.712_v1 | -3.705_f1 | plastic |
| 512 | | 1.3749 | 0.2948_G12 | | | | |
| 521 | 2nd lens lement | 1.1224 | 0.4437_T2 | 1.535_n2 | 55.712_v2 | 1.994_f2 | plastic |
| 522 | | -19.9978 | 0.0360_G23-TA | | | | |
| 500 | Aperture stop | ∞ | 0.2261_TA | | | | |
| 531 | 3rd lens element | -3.0005 | 0.3109_T3 | 1.643_n3 | 22.437_v3 | -5.549_f3 | plastic |
| 532 | | -18.8683 | 0.1016_G34 | | | | |
| 541 | 4th lens element | 0.9375 | 0.5723_T4 | 1.531_n4 | 55.744_v4 | 1.903_f4 | plastic |
| 542 | | 9.8025 | 0.4893_G4F | | | | |
| 551 | IR cut filter | ∞ | 0.2100_TF | | | | glass |
| 552 | | ∞ | 0.5193_GFP | | | | |
| 560 | Image plane | ∞ | | | | | |

FIG. 24

| Aspherical parameters | | | | |
|---|---|---|---|---|
| Surface # | 511 | 512 | 521 | 522 |
| K | 0.0000E+00 | 0.0000E+00 | -7.6977E+00 | 0.0000E+00 |
| $a_2$ | 0.0000E+00 | 0.0000E+00 | 0.0000E+00 | 0.0000E+00 |
| $a_4$ | 1.6861E-02 | -1.6384E-01 | 9.9526E-01 | 2.7498E-01 |
| $a_6$ | 6.4427E-02 | 1.3513E+00 | -5.0153E+00 | -7.5128E+00 |
| $a_8$ | -9.4517E-02 | -4.5810E+00 | 1.1806E+01 | 5.1650E+01 |
| $a_{10}$ | 8.6143E-02 | 9.0672E+00 | -1.2737E+01 | -2.0017E+02 |
| $a_{12}$ | -3.6038E-02 | -1.0674E+01 | -7.5100E+00 | 4.0574E+02 |
| $a_{14}$ | -1.8955E-03 | 7.0881E+00 | 2.0057E+01 | -3.7809E+02 |
| $a_{16}$ | 4.0595E-03 | -2.3514E+00 | -4.4405E+00 | 1.3078E+02 |
| Surface # | 531 | 532 | 541 | 542 |
| K | 2.8606E+01 | 7.5291E+02 | -8.1724E+00 | 0.0000E+00 |
| $a_2$ | 0.0000E+00 | 0.0000E+00 | 0.0000E+00 | 0.0000E+00 |
| $a_4$ | -4.8100E-01 | -1.2565E+00 | -5.1265E-02 | 3.6728E-01 |
| $a_6$ | 2.9954E+00 | 3.1378E+00 | -2.3348E-01 | -6.5949E-01 |
| $a_8$ | -1.3017E+01 | -3.6204E+00 | 4.5122E-01 | 4.8863E-01 |
| $a_{10}$ | 8.0822E+01 | 2.1281E+00 | -4.8902E-01 | -1.9492E-01 |
| $a_{12}$ | -4.1054E+01 | 9.8278E-01 | 2.7630E-01 | 4.0781E-02 |
| $a_{14}$ | -1.1219E+03 | 1.0966E+01 | -2.1551E-02 | -6.2348E-03 |
| $a_{16}$ | 2.5050E+03 | -2.1666E+01 | -9.3678E-02 | 9.5626E-06 |

FIG. 25

| f(Focus)= 1.669mm, HFOV(Half angular field of view)= 48.00deg., System length=3.4989mm, Image height= 1.910mm, Fno=2.1 ||||||||
|---|---|---|---|---|---|---|---|
| Surface # | | Radius | Thickness | Refractive index | Abbe number | Focus | Material |
| - | Object | ∞ | 300.0000 | | | | |
| 611 | 1st lens element | 6.5922 | 0.2644_T1 | 1.535_n1 | 55.712_v1 | -3.289_f1 | plastic |
| 612 | | 1.3730 | 0.2089_G12 | | | | |
| 621 | 2nd lens lement | 0.9829 | 0.4783_T2 | 1.535_n2 | 55.712_v2 | 1.759_f2 | plastic |
| 622 | | -20.0000 | 0.0390_G23-TA | | | | |
| 600 | Aperture stop | ∞ | 0.1885_TA | | | | |
| 631 | 3rd lens element | -3.0000 | 0.3628_T3 | 1.643_n3 | 22.437_v3 | -6.399_f3 | plastic |
| 632 | | -11.3680 | 0.2037_G34 | | | | |
| 641 | 4th lens element | 0.8876 | 0.6412_T4 | 1.531_n4 | 55.744_v4 | 1.915_f4 | plastic |
| 642 | | 5.1067 | 0.5020_G4F | | | | |
| 651 | IR cut filter | ∞ | 0.2100_TF | | | | glass |
| 652 | | ∞ | 0.4000_GFP | | | | |
| 660 | Image plane | ∞ | | | | | |

FIG. 28

| Aspherical parameters | | | | |
|---|---|---|---|---|
| Surface # | 611 | 612 | 621 | 622 |
| K | 0.0000E+00 | 0.0000E+00 | -1.4070E+01 | 0.0000E+00 |
| $a_2$ | 0.0000E+00 | 0.0000E+00 | 0.0000E+00 | 0.0000E+00 |
| $a_4$ | 4.6547E-02 | -3.0430E-01 | 1.1326E+00 | 5.4237E-01 |
| $a_6$ | 5.6428E-02 | 1.2867E+00 | -5.2151E+00 | -1.3015E+01 |
| $a_8$ | -5.0830E-02 | -4.1498E+00 | 1.0537E+01 | 8.6809E+01 |
| $a_{10}$ | 8.6821E-03 | 8.6847E+00 | -9.1787E+00 | -2.9448E+02 |
| $a_{12}$ | 1.3570E-02 | -1.1931E+01 | -4.5134E+00 | 5.1322E+02 |
| $a_{14}$ | 1.2228E-02 | 1.1983E+01 | 2.1910E+01 | -4.6355E+02 |
| $a_{16}$ | -2.2657E-02 | -6.7682E+00 | -2.3504E+01 | 2.5026E+02 |
| Surface # | 631 | 632 | 641 | 642 |
| K | 3.4080E+01 | 2.9760E+02 | -5.9721E+00 | 0.0000E+00 |
| $a_2$ | 0.0000E+00 | 0.0000E+00 | 0.0000E+00 | 0.0000E+00 |
| $a_4$ | -4.1996E-01 | -1.3389E+00 | 5.4395E-03 | 3.4252E-01 |
| $a_6$ | -9.3750E-01 | 3.4588E+00 | -3.1964E-01 | -6.8623E-01 |
| $a_8$ | 7.3599E+00 | -5.0575E+00 | 2.3424E-01 | 5.2205E-01 |
| $a_{10}$ | 7.3860E+01 | 9.7565E-01 | -1.1759E-01 | -2.2471E-01 |
| $a_{12}$ | -1.6051E+02 | 5.0285E+00 | 1.2235E-01 | 5.7925E-02 |
| $a_{14}$ | -1.6911E+03 | 2.4618E+01 | -6.3409E-02 | -1.1303E-02 |
| $a_{16}$ | 5.9479E+03 | -2.4533E+01 | 9.4026E-03 | 1.7699E-03 |

FIG. 29

| | | | | | | | |
|---|---|---|---|---|---|---|---|
| f(Focus)= 1.706mm, HFOV(Half angular field of view)= 46.00deg., System length=3.5032mm, Image height= 1.779mm, Fno=2.1 ||||||||
| Surface # | | Radius | Thickness | Refractive index | Abbe number | Focus | Material |
| - | Object | ∞ | 300.0000 | | | | |
| 711 | 1st lens element | 6.1151 | 0.2452_T1 | 1.535_n1 | 55.712_v1 | -3.457_f1 | plastic |
| 712 | | 1.4039 | 0.3062_G12 | | | | |
| 721 | 2nd lens element | 1.0541 | 0.4045_T2 | 1.535_n2 | 55.712_v2 | 1.906_f2 | plastic |
| 722 | | -30.0000 | 0.0319_G23-TA | | | | |
| 700 | Aperture stop | ∞ | 0.2039_TA | | | | |
| 731 | 3rd lens element | -3.0000 | 0.2650_T3 | 1.643_n3 | 22.437_v3 | -3.687_f3 | plastic |
| 732 | | 12.1419 | 0.2036_G34 | | | | |
| 741 | 4th lens element | 0.8252 | 0.5190_T4 | 1.531_n4 | 55.744_v4 | 1.644_f4 | plastic |
| 742 | | 11.0693 | 0.5575_G4F | | | | |
| 751 | IR cut filter | ∞ | 0.2100_TF | | | | glass |
| 752 | | ∞ | 0.5565_GFP | | | | |
| 760 | Image plane | ∞ | | | | | |

FIG. 32

| Aspherical parameters | | | | |
|---|---|---|---|---|
| Surface # | 711 | 712 | 721 | 722 |
| K | 0.0000E+00 | 0.0000E+00 | -1.1127E+01 | 0.0000E+00 |
| $a_2$ | 0.0000E+00 | 0.0000E+00 | 0.0000E+00 | 0.0000E+00 |
| $a_4$ | -6.3706E-03 | -3.3961E-01 | 8.2219E-01 | 4.9149E-01 |
| $a_6$ | 1.1468E-01 | 1.5626E+00 | -4.4290E+00 | -1.2862E+01 |
| $a_8$ | -5.1883E-02 | -4.4496E+00 | 1.0259E+01 | 8.4929E+01 |
| $a_{10}$ | -2.6862E-02 | 8.8395E+00 | -1.3539E+01 | -3.0285E+02 |
| $a_{12}$ | 2.4219E-02 | -1.2131E+01 | -4.3058E+00 | 5.4870E+02 |
| $a_{14}$ | 1.3716E-02 | 1.0362E+01 | 4.0414E+01 | -3.4274E+02 |
| $a_{16}$ | -2.1646E-02 | -4.2362E+00 | -3.5725E+01 | -1.1366E+02 |
| Surface # | 731 | 732 | 741 | 742 |
| K | 3.0339E+01 | -3.4648E+04 | -7.3130E+00 | 0.0000E+00 |
| $a_2$ | 0.0000E+00 | 0.0000E+00 | 0.0000E+00 | 0.0000E+00 |
| $a_4$ | -6.2693E-01 | -1.6053E+00 | 3.5794E-02 | 3.5715E-01 |
| $a_6$ | 1.2823E+00 | 4.3253E+00 | -2.0215E-01 | -6.4774E-01 |
| $a_8$ | -5.1534E+00 | -5.9250E+00 | 1.3566E-01 | 4.9985E-01 |
| $a_{10}$ | 7.6084E+01 | 2.6255E+00 | -3.1460E-02 | -2.0661E-01 |
| $a_{12}$ | -3.7715E+01 | 1.2276E+00 | -2.4586E-03 | 4.0739E-02 |
| $a_{14}$ | -1.2229E+03 | 4.5563E+01 | -9.1857E-02 | -1.8059E-02 |
| $a_{16}$ | 3.1505E+03 | -5.4178E+01 | 7.2343E-02 | 8.3380E-03 |

FIG. 33

| | f(Focus)= 1.534mm, HFOV(Half angular field of view)= 48.00deg., System length=2.9167mm, Image height= 1.731mm, Fno=2.2 |
|---|---|---|---|---|---|---|---|
| Surface # | | Radius | Thickness | Refractive index | Abbe number | Focus | Material |
| - | Object | ∞ | 300.0000 | | | | |
| 811 | 1st lens element | 180.1212 | 0.3376_T1 | 1.535_n1 | 55.712_v1 | -3.222_f1 | plastic |
| 812 | | 1.7118 | 0.0871_G12 | | | | |
| 821 | 2nd lens element | 0.8254 | 0.3526_T2 | 1.535_n2 | 55.712_v2 | 1.486_f2 | plastic |
| 822 | | -20.0000 | 0.0474_G23-TA | | | | |
| 800 | Aperture stop | ∞ | 0.2317_TA | | | | |
| 831 | 3rd lens element | -3.0000 | 0.2221_T3 | 1.643_n3 | 22.437_v3 | -5.921_f3 | plastic |
| 832 | | -14.1640 | 0.1877_G34 | | | | |
| 841 | 4th lens element | 0.8164 | 0.5721_T4 | 1.531_n4 | 55.744_v4 | 1.927_f4 | plastic |
| 842 | | 3.0150 | 0.4542_G4F | | | | |
| 851 | IR cut filter | ∞ | 0.2100_TF | | | | glass |
| 852 | | ∞ | 0.3142_GFP | | | | |
| 860 | Image plane | ∞ | | | | | |

FIG. 36

| Aspherical parameters | | | | |
|---|---|---|---|---|
| Surface # | 811 | 812 | 821 | 822 |
| K | 0.0000E+00 | 0.0000E+00 | -7.9517E+00 | 0.0000E+00 |
| $a_2$ | 0.0000E+00 | 0.0000E+00 | 0.0000E+00 | 0.0000E+00 |
| $a_4$ | 2.8255E-02 | -2.5935E-01 | 1.2718E+00 | 5.8541E-01 |
| $a_6$ | 7.1961E-02 | 1.3144E+00 | -5.2553E+00 | -1.2635E+01 |
| $a_8$ | -5.9513E-02 | -4.2817E+00 | 1.0092E+01 | 8.5805E+01 |
| $a_{10}$ | -1.0357E-02 | 8.8079E+00 | -9.5468E+00 | -3.0135E+02 |
| $a_{12}$ | -1.2318E-03 | -1.1405E+01 | -6.6102E+00 | 5.1043E+02 |
| $a_{14}$ | 7.7241E-03 | 1.1862E+01 | 3.0401E+01 | -4.5212E+02 |
| $a_{16}$ | -1.9953E-02 | -7.7769E+00 | -1.4445E+01 | 5.7286E+02 |
| Surface # | 831 | 832 | 841 | 842 |
| K | 3.3690E+01 | 5.3328E+02 | -6.8994E+00 | 0.0000E+00 |
| $a_2$ | 0.0000E+00 | 0.0000E+00 | 0.0000E+00 | 0.0000E+00 |
| $a_4$ | -4.9190E-01 | -1.4722E+00 | -1.1751E-02 | 2.6100E-01 |
| $a_6$ | 1.3543E+00 | 3.6120E+00 | -2.1927E-01 | -6.5395E-01 |
| $a_8$ | -1.0662E+01 | -3.4146E+00 | 1.3129E-01 | 5.2744E-01 |
| $a_{10}$ | 8.4631E+01 | 1.1913E+00 | 4.2637E-02 | -1.8887E-01 |
| $a_{12}$ | -1.8733E+01 | 3.5496E-01 | 2.9457E-02 | 2.4540E-02 |
| $a_{14}$ | -1.3986E+03 | 1.2316E+01 | -1.0444E-01 | -3.6906E-03 |
| $a_{16}$ | 3.0725E+03 | -8.3648E+00 | 2.9534E-02 | 1.1772E-03 |

FIG. 37

| Embodiment | 1st | 2nd | 3rd | 4th | 5th | 6th | 7th | 8th |
|---|---|---|---|---|---|---|---|---|
| BFL/G34 | 6.139 | 9.212 | 9.987 | 6.175 | 12.000 | 5.459 | 6.505 | 4.681 |
| T1/T2 | 0.740 | 1.571 | 0.742 | 0.406 | 0.656 | 0.553 | 0.606 | 0.958 |
| T2/G12 | 1.277 | 2.269 | 1.505 | 0.974 | 1.505 | 2.290 | 1.321 | 4.047 |
| AAG/T2 | 1.902 | 1.488 | 1.767 | 1.993 | 1.484 | 1.338 | 1.843 | 1.571 |
| T2/G23 | 1.355 | 1.506 | 1.257 | 1.412 | 1.693 | 2.103 | 1.716 | 1.263 |
| BFL/T3 | 3.513 | 3.633 | 3.699 | 3.465 | 3.920 | 3.065 | 4.996 | 3.955 |
| T4/T3 | 2.361 | 1.468 | 1.596 | 2.994 | 1.841 | 1.767 | 1.958 | 2.576 |
| T1/G34 | 1.945 | 4.107 | 2.420 | 1.571 | 2.864 | 1.298 | 1.205 | 1.799 |
| ALT/G34 | 10.446 | 12.978 | 12.691 | 12.556 | 15.930 | 8.575 | 7.044 | 7.910 |
| BFL/AAG | 1.229 | 2.370 | 1.733 | 0.801 | 1.851 | 1.737 | 1.776 | 1.586 |
| T2/G34 | 2.627 | 2.613 | 3.261 | 3.869 | 4.369 | 2.348 | 1.987 | 1.879 |
| G34/G12 | 0.486 | 0.868 | 0.462 | 0.252 | 0.345 | 0.975 | 0.665 | 2.154 |
| ALT/T3 | 5.977 | 5.118 | 4.701 | 7.046 | 5.203 | 4.815 | 5.410 | 6.684 |
| T3/G34 | 1.748 | 2.536 | 2.700 | 1.782 | 3.061 | 1.781 | 1.302 | 1.183 |
| BFL/T4 | 1.488 | 2.475 | 2.317 | 1.157 | 2.129 | 1.734 | 2.551 | 1.535 |
| ALT/G23 | 5.387 | 7.477 | 4.892 | 4.582 | 6.171 | 7.678 | 6.081 | 5.317 |
| ALT/T2 | 3.977 | 4.966 | 3.891 | 3.246 | 3.646 | 3.652 | 3.544 | 4.210 |
| T4/G23 | 2.128 | 2.145 | 1.661 | 1.947 | 2.183 | 2.819 | 2.201 | 2.049 |
| T4/G12 | 2.006 | 3.231 | 1.989 | 1.343 | 1.941 | 3.070 | 1.695 | 6.566 |

FIG. 38

MOBILE DEVICE AND OPTICAL IMAGING LENS THEREOF

INCORPORATION BY REFERENCE

This application claims priority from P.R.C. Patent Application No. 201410578074.3, filed on Oct. 24, 2014, the contents of which are hereby incorporated by reference in their entirety for all purposes.

TECHNICAL FIELD

The present invention relates to a mobile device and an optical imaging lens thereof, and particularly, relates to a mobile device applying an optical imaging lens having four lens elements and an optical imaging lens thereof.

BACKGROUND

The current trend is toward smaller sized mobile phones in the recent years and the trend correspondingly trigger the development of optical lens elements. Besides, many consumers request the shot angle more and more strictly. U.S. Pat. Nos. 7,443,611 and 7,295,386 disclose an optical imaging lens having four lens elements, wherein the first lens element of the optical imaging lens has positive refracting power, the second lens element of the optical imaging lens has negative refracting power to eliminate the aberrations of the optical imaging lens. However, the design of the optical imaging lens is not beneficial for broadening the shot angle such that the filed angle is only about 30~35 degree, and consumers can't satisfy the range of the filed angle.

Therefore, there is needed to develop optical imaging lens which is capable to place with four lens elements therein, with a shorter length, while also having good optical characteristics and broadening field angles.

SUMMARY

An object of the present invention is to provide a mobile device and an optical imaging lens thereof. With controlling the convex or concave shape of the surfaces, the length of the optical imaging lens is shortened, the good optical characteristics are sustained, and meanwhile the field angle of the optical imaging lens is broadened.

In an exemplary embodiment, an optical imaging lens comprises, sequentially from an object side to an image side along an optical axis, a first lens element, a second lens element, an aperture stop, a third lens element, and a fourth lens element, each of the first, second, third and fourth lens elements having refracting power, an object-side surface facing toward the object side and an image-side surface facing toward the image side and a central thickness defined along the optical axis.

In the specification, parameters used here are: the central thickness of the first lens element, represented by T1, an air gap between the first lens element and the second lens element along the optical axis, represented by G12, the central thickness of the second lens element, represented by T2, an air gap between the second lens element and the third lens element along the optical axis, represented by G23, the central thickness of the third lens element, represented by T3, an air gap between the third lens element and the fourth lens element along the optical axis, represented by G34, the central thickness of the fourth lens element, represented by T4, a distance between the image-side surface of the fourth lens element and the object-side surface of a filtering unit along the optical axis, represented by G4F, the central thickness of the filtering unit along the optical axis, represented by TF, a distance between the image-side surface of the filtering unit and an image plane along the optical axis, represented by GFP, a focusing length of the first lens element, represented by f1, a focusing length of the second lens element, represented by f2, a focusing length of the third lens element, represented by f3, a focusing length of the fourth lens element, represented by f4, the refracting index of the first lens element, represented by n1, the refracting index of the second lens element, represented by n2, the refracting index of the third lens element, represented by n3, the refracting index of the fourth lens element, represented by n4, an abbe number of the first lens element, represented by v1, an abbe number of the second lens element, represented by v2, an abbe number of the third lens element, represented by v3, an abbe number of the fourth lens element, represented by v4, an effective focal length of the optical imaging lens, represented by EFL, a distance between the object-side surface of the first lens element and an image plane along the optical axis, represented by TTL, a sum of the central thicknesses of all four lens elements, i.e. a sum of T1, T2, T3 and T4, represented by ALT, a sum of all three air gaps from the first lens element to the fourth lens element along the optical axis, i.e. a sum of G12, G23 and G34, represented by AAG, a back focal length of the optical imaging lens, which is defined as the distance from the image-side surface of the fourth lens element to the image plane along the optical axis, i.e. a sum of G4F, TF and GFP, and represented by BFL.

In an aspect of the optical imaging lens of the present invention, the object-side surface of the first lens element comprises a convex portion in a vicinity of a periphery of the first lens element; the image-side surface of the first lens element comprises a concave portion in a vicinity of the optical axis and a concave portion in a vicinity of a periphery of the first lens element; the second lens element has positive refracting power; the object-side surface of the second lens element comprises a convex portion in a vicinity of the optical axis and a convex portion in a vicinity of a periphery of the second lens element; the object-side surface of the third lens element comprises a concave portion in a vicinity of the optical axis and a concave portion in a vicinity of a periphery of the third lens element; the image-side surface of the third lens element comprises a convex portion in a vicinity of the optical axis and a convex portion in a vicinity of a periphery of the third lens element; the fourth lens element has positive refracting power; the object-side surface of the fourth lens element comprises a convex portion in a vicinity of the optical axis; the image-side surface of the fourth lens element comprises a concave portion in a vicinity of the optical axis, the optical imaging lens comprises no other lenses having refracting power beyond the four lens elements.

In this present invention, the parameters described above could be controlled to satisfy some equations as follows:

$$BFL/G34 \leq 13.0 \qquad \text{Equation(1); or}$$

$$T1/T2 \leq 1.6 \qquad \text{Equation(2); or}$$

$$G34/G12 \leq 2.2 \qquad \text{Equation(3); or}$$

$$1.2 \leq T2/G12 \qquad \text{Equation(4); or}$$

$$ALT/T3 \leq 10.0 \qquad \text{Equation(5); or}$$

$$AAG/T2 \leq 2.0 \qquad \text{Equation(6); or}$$

$$1.0 \leq T3/G34 \quad \text{Equation(7); or}$$

$$1.0 \leq T2/G23 \quad \text{Equation(8); or}$$

$$1.0 \leq BFL/T4 \quad \text{Equation(9); or}$$

$$BFL/T3 \leq 5.0 \quad \text{Equation(10); or}$$

$$4.5 \leq ALT/G23 \quad \text{Equation(11); or}$$

$$T4/T3 \leq 3.5 \quad \text{Equation(12); or}$$

$$ALT/T2 \leq 5.0 \quad \text{Equation(13); or}$$

$$1.2 \leq T1/G34 \quad \text{Equation(14); or}$$

$$1.5 \leq T4/G23 \quad \text{Equation(15); or}$$

$$7 \leq ALT/G34 \quad \text{Equation(16); or}$$

$$1.6 \leq T1/G34 \quad \text{Equation(17); or}$$

$$1.2 \leq BFL/AAG \quad \text{Equation(18); or}$$

$$2.2 \leq T4/G34 \quad \text{Equation(19)}.$$

Aforesaid exemplary embodiments are not limited and could be selectively incorporated in other embodiments described herein.

In some exemplary embodiments, more details about the convex or concave surface structure could be incorporated for one specific lens element or broadly for plural lens elements to enhance the control for the system performance and/or resolution. It is noted that the details listed here could be incorporated in example embodiments if no inconsistency occurs.

In another exemplary embodiment, a mobile device comprising a housing and a photography module positioned in the housing is provided. The photography module comprises any of aforesaid example embodiments of optical imaging lens, a lens barrel, a module housing unit and an image sensor. The lens barrel is for positioning the optical imaging lens, the module housing unit is for positioning the lens barrel, and the image sensor is positioned at the image side of the optical imaging lens.

Through controlling the convex or concave shape of the surfaces, the mobile device and the optical imaging lens thereof in exemplary embodiments achieve good optical characteristics and effectively shorten the length of the optical imaging lens.

BRIEF DESCRIPTION OF THE DRAWINGS

Exemplary embodiments will be more readily understood from the following detailed description when read in conjunction with the appended drawing, in which:

FIG. 1 is a cross-sectional view of one single lens element according to the present disclosure;

FIG. 2 is a schematic view of the relation between the surface shape and the optical focus of the lens element;

FIG. 8 is a table of optical data for each lens element of a first embodiment of an optical imaging lens according to the present disclosure;

FIG. 9 is a table of aspherical data of a first embodiment of the optical imaging lens according to the present disclosure;

FIG. 12 is a table of optical data for each lens element of the optical imaging lens of a second embodiment of the present disclosure;

FIG. 13 is a table of aspherical data of a second embodiment of the optical imaging lens according to the present disclosure;

FIG. 16 is a table of optical data for each lens element of the optical imaging lens of a third embodiment of the present disclosure;

FIG. 17 is a table of aspherical data of a third embodiment of the optical imaging lens according to the present disclosure;

FIG. 20 is a table of optical data for each lens element of the optical imaging lens of a fourth embodiment of the present disclosure;

FIG. 21 is a table of aspherical data of a fourth embodiment of the optical imaging lens according to the present disclosure;

FIG. 24 is a table of optical data for each lens element of the optical imaging lens of a fifth embodiment of the present disclosure;

FIG. 25 is a table of aspherical data of a fifth embodiment of the optical imaging lens according to the present disclosure;

FIG. 28 is a table of optical data for each lens element of the optical imaging lens of a sixth embodiment of the present disclosure;

FIG. 29 is a table of aspherical data of a sixth embodiment of the optical imaging lens according to the present disclosure;

FIG. 32 is a table of optical data for each lens element of a seventh embodiment of an optical imaging lens according to the present disclosure;

FIG. 33 is a table of aspherical data of a seventh embodiment of the optical imaging lens according to the present disclosure;

FIG. 36 is a table of optical data for each lens element of the optical imaging lens of a eighth embodiment of the present disclosure;

FIG. 37 is a table of aspherical data of a eighth embodiment of the optical imaging lens according to the present disclosure;

FIG. 38 is a table for the values of BFL/G34, T1/T2, T2/G12, AAG/T2, T2/G23, BFL/T3, T4/T3, T1/G34, ALT/G34, BFL/AAG, T2/G34, G34/G12, ALT/T3, T3/G34, BFL/T4, ALT/G23, ALT/T2, T4/G23, and T4/G12 of all eighth example embodiments;

DETAILED DESCRIPTION

Figure 3:
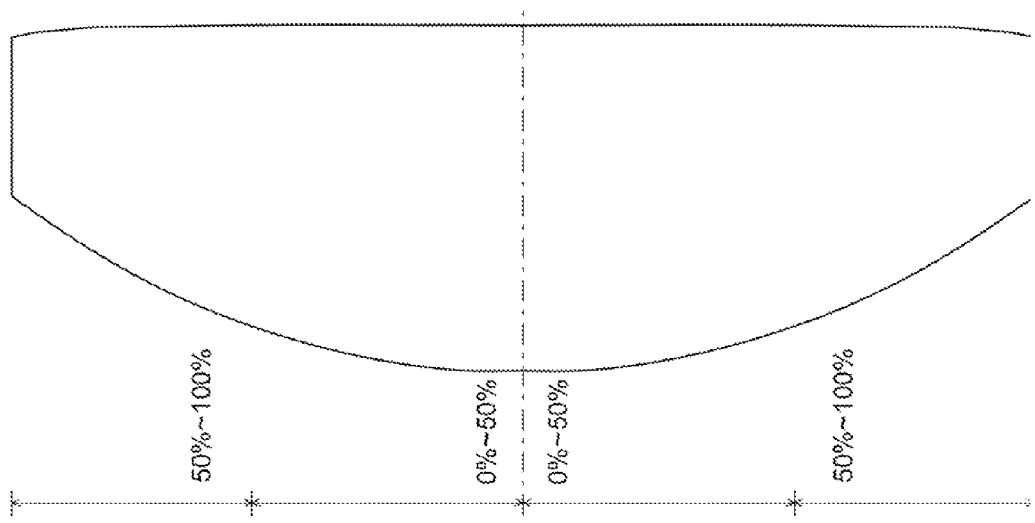
FIG. 3 is a schematic view of a first example of the surface shape and the efficient radius of the lens element.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present specification, the description "a lens element having positive refracting power (or negative refractive power)" means that the paraxial refractive power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a part in a vicinity of the optical axis", and the region C of the lens element is defined as "a part in a vicinity of a periphery of the lens element". Besides, the lens element may also have an extending part E extended radially and outwardly from the region C, namely the part outside of the clear aperture of the lens element. The extending part E is usually used for physically assembling the lens element into an optical imaging lens system. Under normal circumstances, the imaging rays would not pass through the extending part E because those imaging rays only pass through the clear aperture. The structures and shapes of the aforementioned extending part E are only examples for technical explanation, the structures and shapes of lens elements should not be limited to these examples. Note that the extending parts of the lens element surfaces depicted in the following embodiments are partially omitted.

The following criteria are provided for determining the shapes and the parts of lens element surfaces set forth in the present specification. These criteria mainly determine the boundaries of parts under various circumstances including the part in a vicinity of the optical axis, the part in a vicinity of a periphery of a lens element surface, and other types of lens element surfaces such as those having multiple parts.

1. FIG. 1 is a radial cross-sectional view of a lens element. Before determining boundaries of those aforesaid parts, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The part of a surface of the lens element between the central point and the first transition point is defined as the part in a vicinity of the optical axis. The part located radially outside of the Nth transition point (but still within the scope of the clear aperture) is defined as the part in a vicinity of a periphery of the lens element. In some embodiments, there are other parts existing between the part in a vicinity of the optical axis and the part in a vicinity of a periphery of the lens element; the numbers of parts depend on the numbers of the transition point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a part is convex or concave depends on whether a collimated ray passing through that part converges or diverges. That is, while applying a collimated ray to a part to be determined in terms of shape, the collimated ray passing through that part will be bended and the ray itself or its extension line will eventually meet the optical axis. The shape of that part can be determined by whether the ray or its extension line meets (intersects) the optical axis (focal point) at the object-side or image-side. For instance, if the ray itself intersects the optical axis at the image side of the lens element after passing through a part, i.e. the focal point of this ray is at the image side (see point R in FIG. 2), the part will be determined as having a convex shape. On the contrary, if the ray diverges after passing through a part, the extension line of the ray intersects the optical axis at the object side of the lens element, i.e. the focal point of the ray is at the object side (see point M in FIG. 2), that part will be determined as having a concave shape. Therefore, referring to FIG. 2, the part between the central point and the first transition point has a convex shape, the part located radially outside of the first transition point has a concave shape, and the first transition point is the point where the part having a convex shape changes to the part having a concave shape, namely the border of two adjacent parts. Alternatively, there is another common way for a person with ordinary skill in the art to tell whether a part in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the part in a vicinity of the optical axis is defined as the part between 0~50% of the effective radius (radius of the clear aperture) of the surface, whereas the part in a vicinity of a periphery of the lens element is defined as the part between 50~100% of effective radius (radius of the clear aperture) of the surface.

Referring to the first example depicted in FIG. 3, only one transition point, namely a first transition point, appears within the clear aperture of the image-side surface of the lens element. Part I is a part in a vicinity of the optical axis, and part II is a part in a vicinity of a periphery of the lens element. The part in a vicinity of the optical axis is determined as having a concave surface due to the R value at the image-side surface of the lens element is positive. The shape of the part in a vicinity of a periphery of the lens element is different from that of the radially inner adjacent part, i.e. the shape of the part in a vicinity of a periphery of the lens element is different from the shape of the part in a vicinity of the optical axis; the part in a vicinity of a periphery of the lens element has a convex shape.

Figure 4:
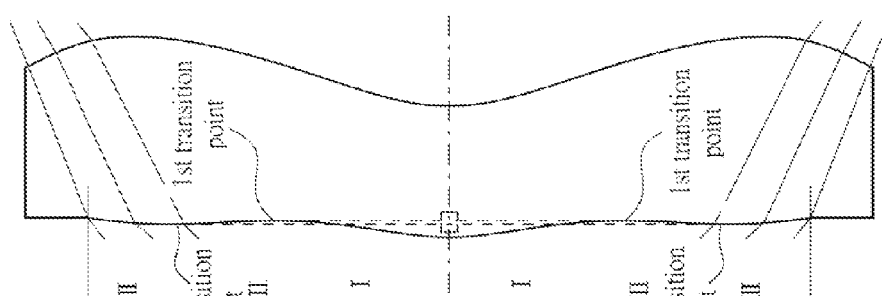
FIG. 4 is a schematic view of a second example of the surface shape and the efficient radius of the lens element.

Referring to the second example depicted in FIG. 4, a first transition point and a second transition point exist on the object-side surface (within the clear aperture) of a lens element. In which part I is the part in a vicinity of the optical axis, and part III is the part in a vicinity of periphery of the lens element. The part in a vicinity of the optical axis has a convex shape because the R value at the object-side surface of the lens element is positive. The part in a vicinity of a periphery of the lens element (part III) has a convex shape. What is more, there is another part having a concave shape existing between the first and second transition point (part II).

Figure 5:
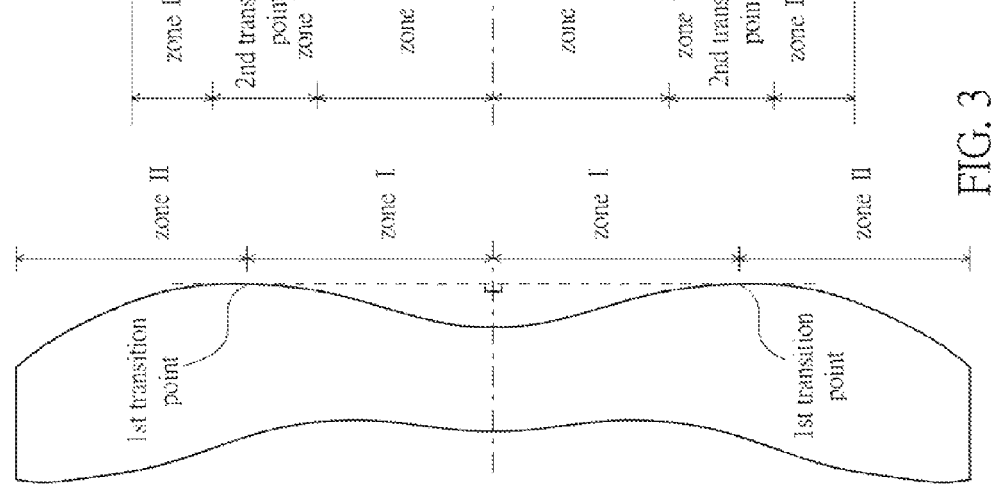
FIG. 5 is a schematic view of a third example of the surface shape and the efficient radius of the lens element.

Referring to a third example depicted in FIG. 5, no transition point exists on the object-side surface of the lens element. In this case, the part between 0~50% of the effective radius (radius of the clear aperture) is determined as the part in a vicinity of the optical axis, and the part between 50~100% of the effective radius is determined as the part in a vicinity of a periphery of the lens element. The part in a vicinity of the optical axis of the object-side surface of the lens element is determined as having a convex shape due to its positive R value, and the part in a vicinity of a periphery of the lens element is determined as having a convex shape as well.

The optical imaging lens of the present invention is a prime lens, the optical imaging lens may comprise a first lens element, a second lens element, a third lens element, and a fourth lens element, and these lens elements may be arranged sequentially from the object side to the image side along an optical axis. Each of the lens elements comprises refracting power, an object-side surface facing toward an object side and an image-side surface facing toward an image side. The optical imaging lens may comprise no other lenses having refracting power beyond the four lens elements. The design of the detail characteristics of each lens element can provide the improved imaging quality and short optical imaging lens.

The second lens element and the fourth lens element have positive refracting power, and the demand of the positive refracting power of the optical imaging lens is provided by the second lens element and the fourth lens element. The second lens element and the fourth lens element share the demand of positive refracting power to reduce the difficulty for manufacturing the optical imaging lens.

The object-side surface of the first lens element comprises a convex portion in a vicinity of a periphery of the first lens element, and the convex portion can facilitate to collect imaging light. The image-side surface of the first lens element is a concave surface, the object-side surface of the second lens element is a convex surface, the object-side surface of the third lens element is a concave surface, the image-side surface of the third lens element is a convex surface, the object-side surface of the fourth lens element comprises a convex portion in a vicinity of the optical axis, the image-side surface of the fourth lens element comprises a concave portion in a vicinity of the optical axis, the arrangements of these lens element can enhance the imaging quality.

The ratios of BFL/G34, BFL/AAG, and G34/G12 can be appropriately controlled to improve the performance of the optical imaging lens and shorten the total length of the optical imaging lens. For example, BFL, G34, AAG, and G12 can be satisfied these equations: $BFL/G34 \leq 13$, $BFL/AAG \geq 1.2$, and $G34/G12 \leq 2.2$.

The ratios of BFL/G34, BFL/AAG, and G34/G12 can be appropriately controlled to reduce the total thickness of the optical imaging lens. For example, BFL, G34, AAG, and G12 can be satisfied these equations: $3.0 \leq BFL/G34 \leq 13$, $1.2 \leq BFL/AAG \leq 2.5$, and $0.2 \leq G34/G12 \leq 2.2$.

T2, G12, AAG, G23, T1, G34, ALT, T3, and T4 can be satisfied these equations: $T2/G12 \geq 1.2$, $AAG/T2 \leq 2.0$, $T2/G23 \geq 1.0$, $T1/G34 \geq 1.2$, $ALT/G34 \geq 7.0$, $T2/G34 \geq 2.2$, $T3/G34 \geq 1.0$, $ALT/G23 \geq 4.5$, $T4/G23 \geq 1.5$, and $T4/G12 \geq 1.6$. Because the shortening of the thickness of lens element is limited by the present manufacturing skills, the reductions of T1, T2, T3, T4 are limited. However, G12, G23, G34, and AAG can be designed more freely and be reduced as soon as possible in order to reducing the total length of the optical imaging lens. Therefore, T2/G12, T2/G23, T1/G34, ALT/G23, T4/G23, T4/G12 should be designed to be bigger, and AAG/T2 should be designed to be smaller. T2/G12 should be bigger than 1.2 or be equal to 1.2. More perfectly, T2/G12 should be between 1.2~5.0. AAG/T2 should be smaller than 2.0 or be equal to 2.0. More perfectly, AAG/T2 should be between 1.0~2.0. T2/G23 should be bigger than 1.0 or be equal to 1.0. More perfectly, T2/G23 should be between 1.0~2.5. T1/G34 should be bigger than 1.2 or be equal to 1.2. More perfectly, T1/G34 should be between 1.2~5.0. ALT/G34 should be bigger than 7.0 or be equal to 7.0. More perfectly, ALT/G34 should be between 7.0~25.0. T2/G34 should be bigger than 2.2 or be equal to 2.2. More perfectly, T2/G34 should be between 2.2~5.0. T3/G34 should be bigger than 1.0 or be equal to 1.0. More perfectly, T3/G34 should be between 1.0~4.0. ALT/G23 should be bigger than 4.5 or be equal to 4.5. More perfectly, ALT/G23 should be between 4.5~10.0. T4/G23 should be bigger than 1.5 or be equal to 1.5. More perfectly, T4/G23 should be between 1.5~4.0. T4/G12 should be bigger than 1.6 or be equal to 1.6. More perfectly, T4/G12 should be between 1.6~6.0.

T1/T2 should be smaller than 1.6 or be equal to 1.6, T4/T3 should be smaller than 3.5 or be equal to 3.5, ALT/T3 should be smaller than 10.0 or be equal to 10.0, ALT/T2 should be smaller than 5.0 or be equal to 5.0. The suitable proportions of T1~T4 and ALT should be maintained to avoid that any one lens element is too thick so that the optical imaging lens is too long or any one lens element is too thin so that the optical imaging lens is manufactured difficulty. T1/T2 should be smaller than 1.6 or be equal to be 1.6. More perfectly, T1/T2 should be between 0.5~1.6. T4/T3 should be smaller than 3.5 or be equal to 3.5. More perfectly, T4/T3 should be between 1.0~3.5. ALT/T3 should be smaller than 10.0 or be equal to 10.0. More perfectly, ALT/T3 should be between 3.0~10.0. ALT/T2 should be smaller than 5.0 or be equal to 5.0. More perfectly, ALT/T2 should be between 2.5~5.0.

BFL/T3 should be smaller than 5.0 or be equal to 5.0, BFL/T4 should be bigger than 1.0 or be equal to 1.0 to avoid that BFL is too big or BFL is too small. More perfectly, BFL/T3 should be between 2.5~5.0. More perfectly, BFL/T4 should be between 1.0~3.0.

When implementing example embodiments, more details about the convex or concave surface could be incorporated for one specific lens element or broadly for plural lens elements to enhance the control for the system performance and/or resolution. It is noted that the details listed here could be incorporated in example embodiments if no inconsistency occurs.

Figure 6:
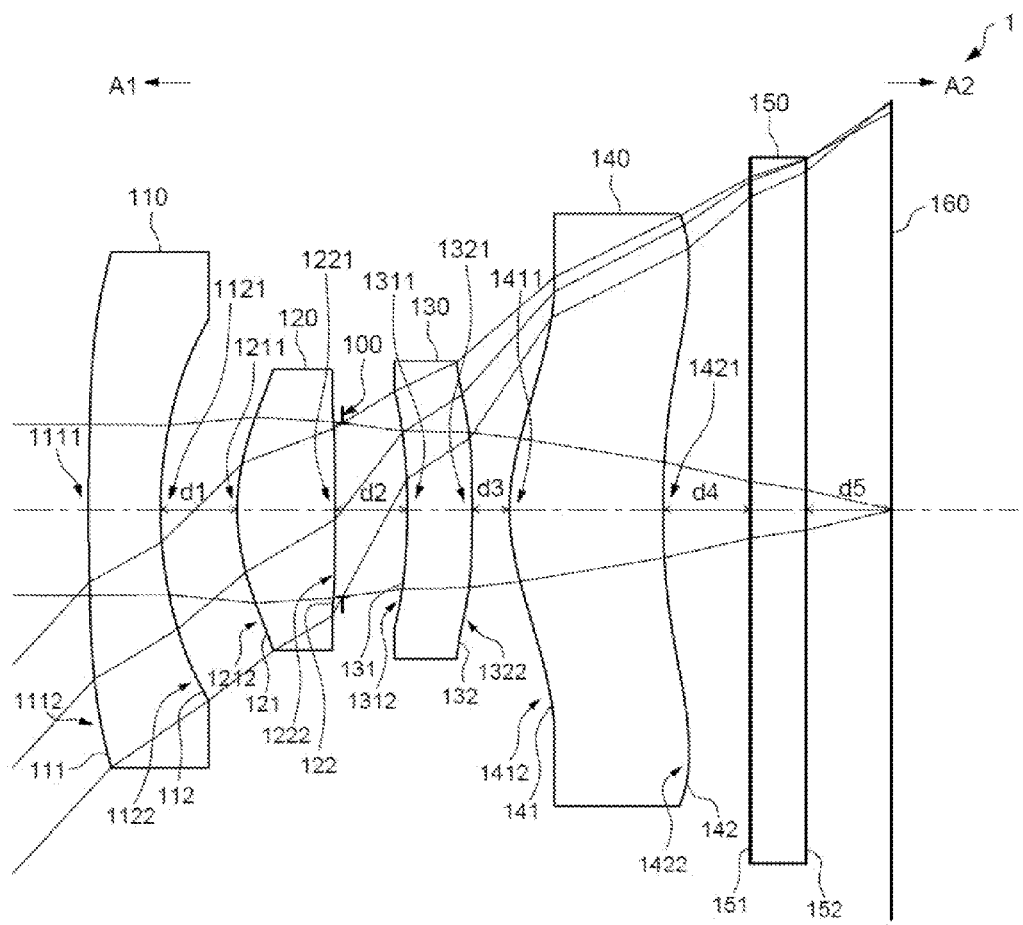
FIG. 6 is a cross-sectional view of a first embodiment of an optical imaging lens having six lens elements according to the present disclosure.
Figure 7:
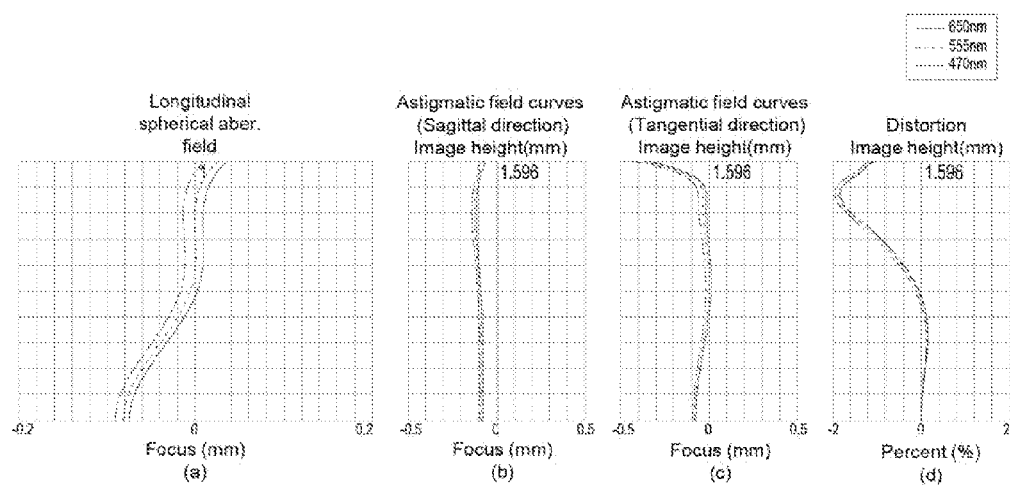
FIG. 7 is a chart of longitudinal spherical aberration and other kinds of optical aberrations of a first embodiment of the optical imaging lens according to the present disclosure.

Several exemplary embodiments and associated optical data will now be provided for illustrating example embodiments of optical imaging lens with good optical characteristics and a shortened length. Reference is now made to FIGS. 6-9. FIG. 6 illustrates an example cross-sectional view of an optical imaging lens 1 having four lens elements of the optical imaging lens according to a first example embodiment. FIG. 7 shows example charts of longitudinal spherical aberration and other kinds of optical aberrations of the optical imaging lens 1 according to an example embodiment. FIG. 8 illustrates an example table of optical data of each lens element of the optical imaging lens 1 according to an example embodiment, in which f is used for representing EFL. FIG. 9 depicts an example table of aspherical data of the optical imaging lens 1 according to an example embodiment.

As shown in FIG. 6, the optical imaging lens 1 of the present embodiment comprises, in order from an object side A1 to an image side A2 along an optical axis, a first lens element 110, a second lens element 120, an aperture stop 100, a third lens element 130, and a fourth lens element 140. A filtering unit 150 and an image plane 160 of an image sensor are positioned at the image side A2 of the optical lens 1. Each of the first, second, third, fourth lens elements 110, 120, 130, 140 and the filtering unit 150 comprises an object-side surface 111/121/131/141/151 facing toward the object side A1 and an image-side surface 112/122/132/142/152 facing toward the image side A2. The example embodiment of the filtering unit 150 illustrated is an IR cut filter (infrared cut filter) positioned between the fourth lens element 140 and an image plane 160. The filtering unit 150 selectively absorbs light with specific wavelength from the light passing optical imaging lens 1. For example, IR light is absorbed, and this will prohibit the IR light which is not seen by human eyes from producing an image on the image plane 160.

Please noted that during the normal operation of the optical imaging lens 1, the distance between any two adjacent lens elements of the first, second, third, and fourth lens elements 110, 120, 130, 140 is an unchanged value, i.e. the optical imaging lens 1 is a prime lens.

Exemplary embodiments of each lens element of the optical imaging lens 1 which may be constructed by plastic material will now be described with reference to the drawings.

An example embodiment of the first lens element 110 has negative refracting power. The object-side surface 111 is a convex surface comprising a convex portion 1111 in a vicinity of the optical axis and a convex portion 1112 in a vicinity of a periphery of the first lens element 110. The image-side surface 112 is a concave surface comprising a concave portion 1121 in a vicinity of the optical axis and a concave portion 1122 in a vicinity of the periphery of the first lens element 110. The object-side surface 111 and the image-side surface 112 are aspherical surfaces.

An example embodiment of the second lens element 120 has positive refracting power. The object-side surface 121 comprises a convex portion 1211 in a vicinity of the optical axis and a convex portion 1212 in a vicinity of a periphery of the second lens element 120. The image-side surface 122 is a convex surface comprising a convex portion 1221 in a vicinity of the optical axis and a convex portion 1222 in a vicinity of the periphery of the second lens element 120.

An example embodiment of the third lens element 130 has negative refracting power. The object-side surface 131 comprises a concave portion 1311 in a vicinity of the optical axis and concave portion 1312 in a vicinity of a periphery of the third lens element 130. The image-side surface 132 is a convex surface comprising a convex portion 1321 in a vicinity of the optical axis and a convex portion 1322 in a vicinity of the periphery of the third lens element 130. The object-side surface 131 and the image-side surface 132 are aspherical surfaces.

An example embodiment of the fourth lens element 140 has positive refracting power. The object-side surface 141 is a convex surface comprising a convex portion 1411 in a vicinity of the optical axis and a convex portion 1412 in a vicinity of a periphery of the fourth lens element 140. The image-side surface 142 comprises a concave portion 1421 in a vicinity of the optical axis and a convex portion 1422 in a vicinity of the periphery of the fourth lens element 140. The object-side surface 141 and the image-side surface 142 are aspherical surfaces.

In example embodiments, air gaps exist between the lens elements 110, 120, 130, 140, the filtering unit 150 and the image plane 160 of the image sensor. For example, FIG. 1 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the filtering unit 150, the air gap d5 existing between the filtering unit 150 and the image plane 160 of the image sensor. However, in other embodiments, any of the aforesaid air gaps may or may not exist. For example, the profiles of opposite surfaces of any two adjacent lens elements may correspond to each other, and in such situation, the air gap may not exist. The air gap d1 is denoted by G12, the air gap d2 is denoted by G23, the air gap d3 is denoted by G34, and the sum of d1, d2, and d3 is denoted by AAG.

FIG. 8 depicts the optical characteristics of each lens elements in the optical imaging lens 1 of the present embodiment, and please refer to FIG. 38 for the values of BFL/G34, T1/T2, T2/G12, AAG/T2, T2/G23, BFL/T3, T4/T3, T1/G34, ALT/G34, BFL/AAG, T2/G34, G34/G12, ALT/T3, T3/G34, BFL/T4, ALT/G23, ALT/T2, T4/G23, and T4/G12 of the present embodiment.

FIG. 9 depicts an example table of aspherical data of the optical imaging lens according to an example embodiment.

The distance from the object-side surface 111 of the first lens element 110 to the image plane 160 along the optical axis is 3.064 mm, the image height is 1.596 mm. The length of the optical imaging lens 1 is shortened compared with conventional optical imaging lenses. Thus, the optical imaging lens 1 is capable to provide excellent imaging quality for smaller sized mobile devices.

The aspherical surfaces including the object-side surface 111 of the first lens element 110, the image-side surface 112 of the first lens element 110, the object-side surface 121 and the image-side surface 122 of the second lens element 120, the object-side surface 131 and the image-side surface 132 of the third lens element 130, the object-side surface 141 and the image-side surface 142 of the fourth lens element 140 are all defined by the following aspherical formula:

$$Z(Y) = \frac{Y^2}{R} \bigg/ \left(1 + \sqrt{1 - (1+K)\frac{Y^2}{R^2}}\right) + \sum_{i=1}^{n} a_i \times Y^i$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_i$ represents an aspherical coefficient of $i^{th}$ level.

The values of each aspherical parameter are shown in FIG. 13.

FIG. 7(a) shows the longitudinal spherical aberration, wherein the transverse axis of FIG. 7(a) defines the focus, and the lengthwise axis of FIG. 7(a) defines the filed. From the vertical deviation of each curve shown in FIG. 7(a), the offset of the off-axis light relative to the image point is within ±0.1 mm. Therefore, the first embodiment indeed improves the longitudinal spherical aberration with respect to different wavelengths. Furthermore, the curves of different wavelengths are closed to each other, and this situation represents that off-axis light with respect to these wavelengths is focused around an image point, and the aberration can be improved obviously.

FIGS. 7(b) and 7(c) respectively show the astigmatism aberration in the sagittal direction and astigmatism aberration in the tangential direction, wherein the transverse axis of FIG. 7(b) defines the focus, the lengthwise axis of FIG. 7(b) defines the image height, the transverse axis of FIG. 7(c) defines the focus, the lengthwise axis of FIG. 7(c) defines the image height, and the image height is 1.596 mm. Referring to FIG. 7(b), the focus variation with respect to the three different wavelengths (470 nm, 555 nm, 650 nm) in the whole field falls within ±0.15 mm. Referring to FIG. 7(c), the focus variation with respect to the three different wavelengths (470 nm, 555 nm, 650 nm) in the whole field falls within ±0.45 mm. Therefore, the optical imaging lens 1 indeed eliminates aberration effectively. Additionally, the three curves presenting different wavelengths are closed to each other, and these closed curves represents that the dispersion is improved.

Please refer to FIG. 7(d), the transverse axis of FIG. 7(d) defines the percentage, the lengthwise axis of FIG. 7(d) defines the image height, and the image height is 3.085 mm. The variation of the distortion aberration is within ±2.0%. Therefore, the optical imaging lens 1 of the present embodiment shows great characteristics in the longitudinal spherical aberration, astigmatism in the sagittal direction, astigmatism in the tangential direction, and distortion aberration. According to above illustration, the optical imaging lens 1 of the example embodiment indeed achieves great optical performance and the length of the optical imaging lens 1 is effectively shortened.

Figure 10:
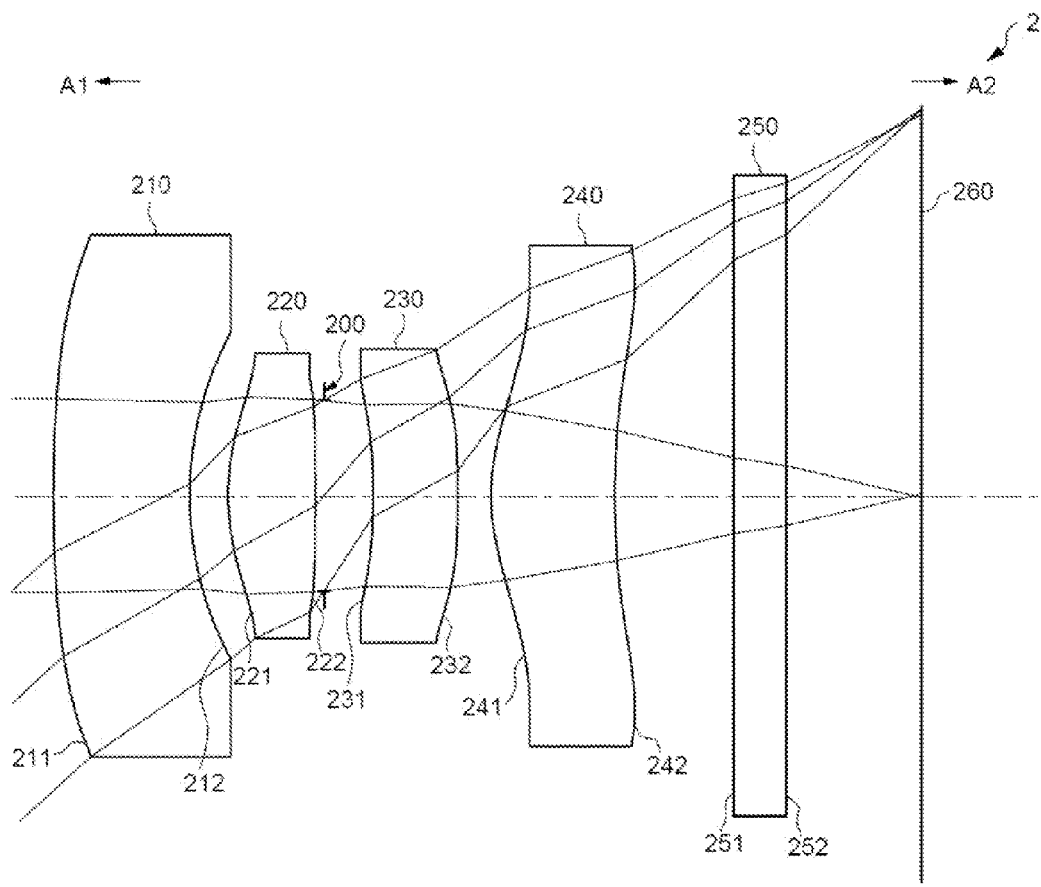
FIG. 10 is a cross-sectional view of a second embodiment of an optical imaging lens having six lens elements according to the present disclosure.
Figure 11:
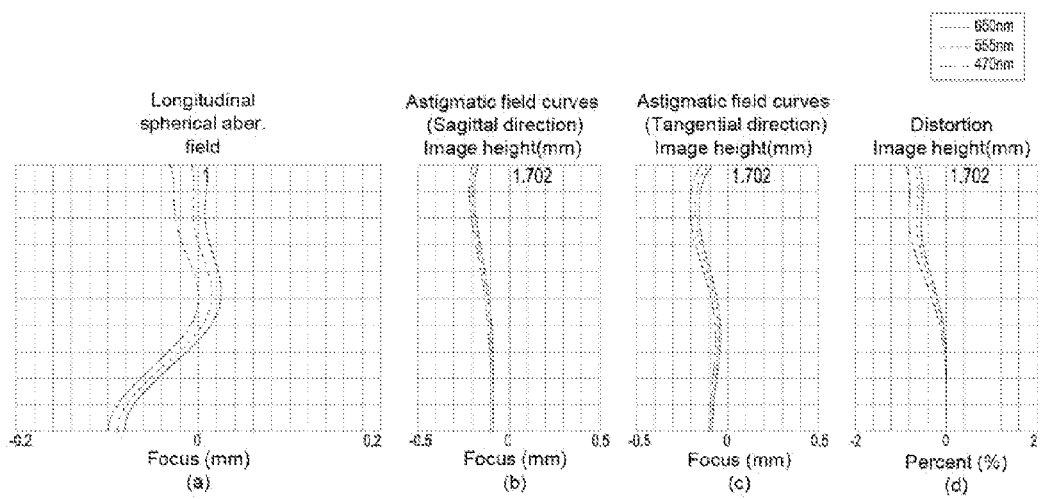
FIG. 11 is a chart of longitudinal spherical aberration and other kinds of optical aberrations of a second embodiment of the optical imaging lens according to the present disclosure.

Reference is now made to FIGS. 10-13. FIG. 10 illustrates an example cross-sectional view of an optical imaging lens 2 having four lens elements of the optical imaging lens 2 according to a second example embodiment. FIG. 11 shows example charts of longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 10, the optical imaging lens 2 of the present embodiment, in an order from an object side A1 to an image side A2 along an optical axis, comprises a first lens element 210, a second lens element 220, an aperture stop 200, a third lens element 230, and a fourth lens element 240.

The differences between the second embodiment and the first embodiment are the radius of curvature, thickness of each lens element, aspherical parameters of each lens element, or the back focal length, but the configuration of the positive/negative refracting power of the first, second, third, and fourth lens elements 210, 220, 230, 240 and configuration of the concave/convex shape of surfaces comprising the object-side surfaces 211, 221, 231, 241 facing to the object side A1 and the image-side surfaces 212, 222, 232, 242 facing to the image side A2 are similar to those in the first embodiment. Here, for clearly showing the drawings of the present embodiment, only the surface shapes which are different from that in the first embodiment are labeled. Please refer to FIG. 8 for the optical characteristics of each lens elements in the optical imaging lens 2 the present embodiment, and please refer to FIG. 38 for the values of BFL/G34, T1/T2, T2/G12, AAG/T2, T2/G23, BFL/T3, T4/T3, T1/G34, ALT/G34, BFL/AAG, T2/G34, G34/G12, ALT/T3, T3/G34, BFL/T4, ALT/G23, ALT/T2, T4/G23, and T4/G12 of the present embodiment.

The distance from the object-side surface 211 of the first lens element 210 to the image plane 260 along the optical axis is 3.49 mm and the image height of the optical imaging lens 2 is 1.702 mm. Therefore, the length of the length of the optical imaging lens 2 is shortened compared with conventional optical imaging lenses.

FIG. 11(a) shows the longitudinal spherical aberration. From the vertical deviation of each curve shown in FIG. 11(a), the offset of the off-axis light relative to the image point is within ±0.1 mm. Furthermore, the three curves having different wavelengths are closed to each other, and this situation represents that off-axis light with respect to these wavelengths is focused around an image point, and the aberration can be improved obviously.

FIGS. 11(b) and 11(c) respectively show the astigmatism aberration in the sagittal direction and astigmatism aberration in the tangential direction, Referring to FIG. 11(b), the focus variation with respect to the three different wavelengths (470 nm, 555 nm, 650 nm) in the whole field falls within ±0.25 mm. Referring to FIG. 11(c), the focus variation with respect to the three different wavelengths (470 nm, 555 nm, 650 nm) in the whole field falls within ±0.2 mm. Additionally, the three curves presenting different wavelengths are closed to each other, and these closed curves represents that the dispersion is improved.

Please refer to FIG. 11(d), the variation of the distortion aberration of the optical imaging lens 2 is within ±1.0%. Therefore, the optical imaging lens 2 of the present embodiment shows great characteristics in the longitudinal spherical aberration, astigmatism in the sagittal direction, astigmatism in the tangential direction, and distortion aberration. According to above illustration, the optical imaging lens 2 of the example embodiment indeed achieves great optical performance and the length of the optical imaging lens 2 is effectively shortened.

Figure 14:
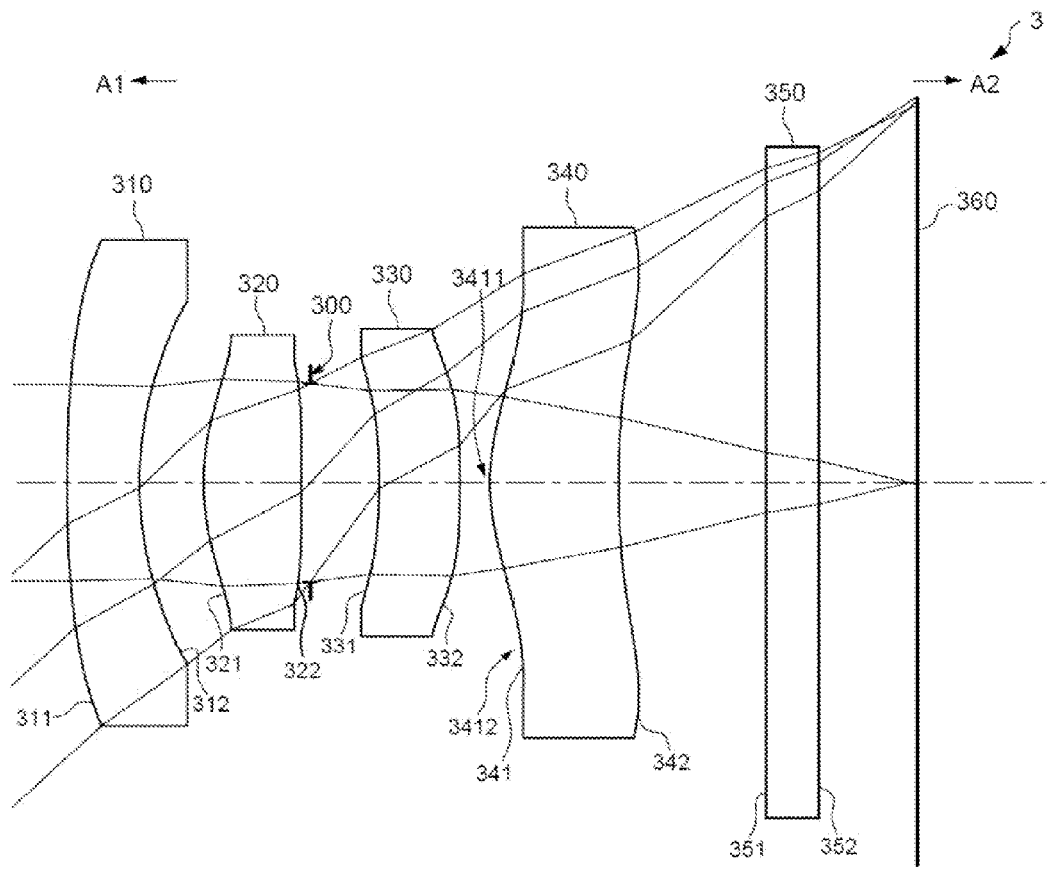
FIG. 14 is a cross-sectional view of a third embodiment of an optical imaging lens having six lens elements according to the present disclosure.
Figure 15:
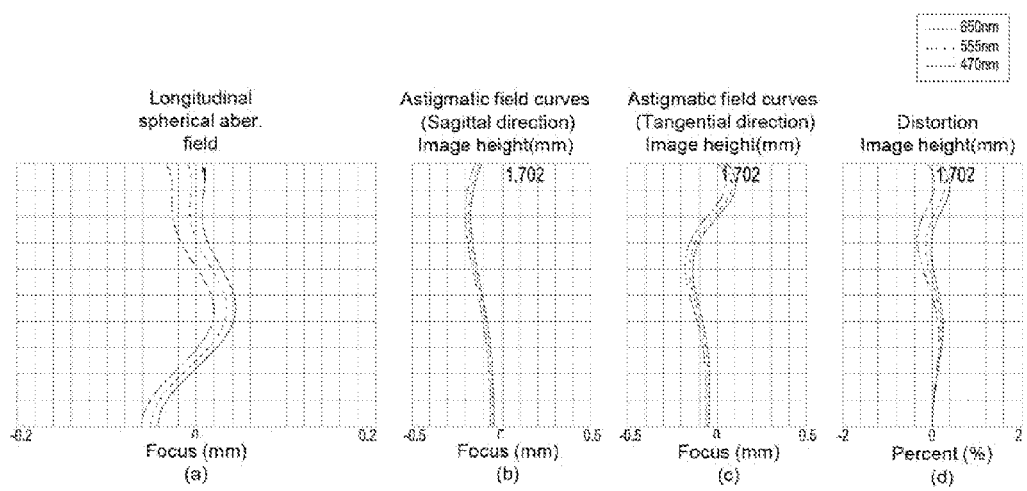
FIG. 15 is a chart of longitudinal spherical aberration and other kinds of optical aberrations of a third embodiment of the optical imaging lens according the present disclosure.

Reference is now made to FIGS. 14-17. FIG. 14 illustrates an example cross-sectional view of an optical imaging lens 3 having four lens elements of the optical imaging lens according to a third example embodiment. FIG. 15 shows example charts of longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 14, the optical imaging lens 3 of the present embodiment, in an order from an object side A1 to an image side A2 along an optical axis, comprises a first lens element 310, a second lens element 320, an aperture stop 300, a third lens element 330, and a fourth lens element 340.

The configuration of the positive/negative refracting power of the first, second, third, and fourth lens elements 310, 320, 330, 340 and configuration of the concave/convex shape of surfaces comprising the object-side surfaces 311, 321, 331 facing to the object side A1 and the image-side surfaces 312, 322, 332, 342 facing to the image side A2, are similar to those in the first embodiment, but the differences between the third embodiment and the first embodiment comprise the radius of curvature, thickness of each lens element, aspherical parameters of each lens element, and the back focal length. Here, for clearly showing the drawings of the present embodiment, only the surface shapes which are different from that in the first embodiment are labeled. Specifically, the object-side surface 341 of the fourth lens element 340 comprises a convex portion 3411 in a vicinity of the optical axis and a concave portion 3412 in a vicinity of a periphery of the fourth lens element 340. FIG. 16 depicts the optical characteristics of each lens elements in the optical imaging lens 3 of the present embodiment, and please refer to FIG. 38 for the values of BFL/G34, T1/T2, T2/G12, AAG/T2, T2/G23, BFL/T3, T4/T3, T1/G34, ALT/G34, BFL/AAG, T2/G34, G34/G12, ALT/T3, T3/G34, BFL/T4, ALT/G23, ALT/T2, T4/G23, and T4/G12 of the present embodiment.

The distance from the object-side surface 311 of the first lens element 310 to the image plane 360 along the optical axis is 3.434 mm and the image height of the optical imaging lens 3 is 1.702 mm. Therefore, the length of the optical imaging lens 3 is shortened compared with conventional optical imaging lenses.

FIG. 15(a) shows the longitudinal spherical aberration. From the vertical deviation of each curve shown in FIG. 15(a), the offset of the off-axis light relative to the image point is within ±0.08 mm. Furthermore, the three curves having different wavelengths are closed to each other, and this situation represents that off-axis light with respect to these wavelengths is focused around an image point, and the aberration can be improved obviously.

FIGS. 15(b) and 15(c) respectively show the astigmatism aberration in the sagittal direction and astigmatism aberration in the tangential direction. Referring to FIG. 15(b), the focus variation with respect to the three different wavelengths (470 nm, 555 nm, 650 nm) in the whole field falls within ±0.2 mm. Referring to FIG. 15(c), the focus variation with respect to the three different wavelengths (470 nm, 555 nm, 650 nm) in the whole field falls within ±0.2 mm. Additionally, the three curves presenting different wavelengths are closed to each other, and these closed curves represents that the dispersion is improved.

Please refer to FIG. 15(d), the variation of the distortion aberration of the optical imaging lens 3 is within ±0.4%.

Therefore, the optical imaging lens 3 of the present embodiment shows great characteristics in the longitudinal spherical aberration, astigmatism in the sagittal direction, astigmatism in the tangential direction, and distortion aberration. According to above illustration, the optical imaging lens 3 of the example embodiment indeed achieves great optical performance and the length of the optical imaging lens 3 is effectively shortened.

Figure 18:
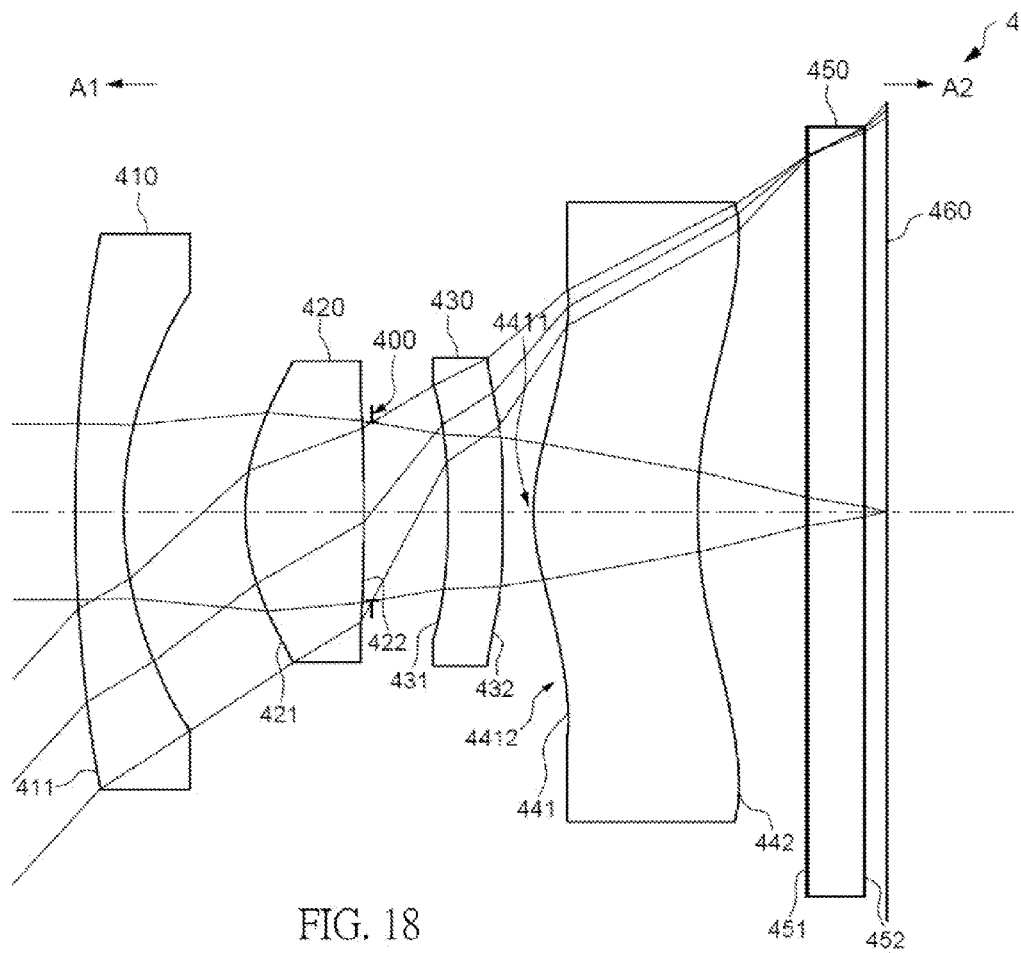
FIG. 18 is a cross-sectional view of a fourth embodiment of an optical imaging lens having six lens elements according to the present disclosure.
Figure 19:
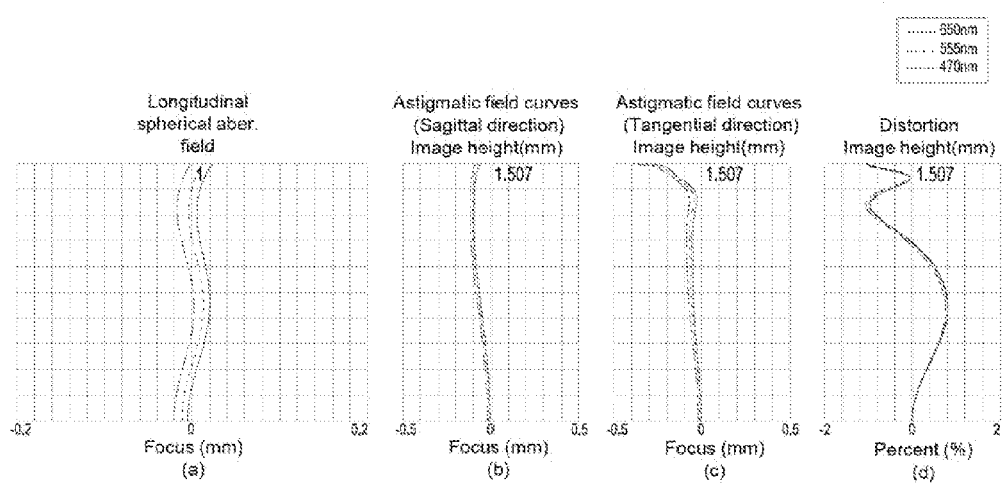
FIG. 19 is a chart of longitudinal spherical aberration and other kinds of optical aberrations of a fourth embodiment of the optical imaging lens according the present disclosure.

Reference is now made to FIGS. 18-21. FIG. 18 illustrates an example cross-sectional view of an optical imaging lens 4 having four lens elements of the optical imaging lens 4 according to a fourth example embodiment. FIG. 19 shows example charts of longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 18, the optical imaging lens 4 of the present embodiment, in an order from an object side A1 to an image side A2 along an optical axis, comprises a first lens element 410, a second lens element 420, an aperture stop 400, a third lens element 430, and a fourth lens element 440.

The configuration of the positive/negative refracting power of the first, second, third and fourth lens elements 410, 420, 430, 440 and configuration of the concave/convex shape of surfaces, comprising the object-side surfaces 411, 421, 431 facing to the object side A1 and the image-side surfaces 412, 422, 432, 442 facing to the image side A2, are similar to those in the first embodiment, but the differences between the fourth embodiment and the first embodiment are the radius of curvature, thickness of each lens element, aspherical parameters of each lens element, the back focal length, and the configuration of the concave/convex shape of the object-side surface 441. Here, for clearly showing the drawings of the present embodiment, only the surface shapes which are different from that in the first embodiment are labeled. Specifically, the object-side surface 441 of the fourth lens element 440 comprises a convex portion 4411 in a vicinity of the optical axis and a concave portion 4412 in a vicinity of a periphery of the fourth lens element 440.

FIG. 20 depicts the optical characteristics of each lens elements in the optical imaging lens 4 of the present embodiment, and please refer to FIG. 38 for the values of BFL/G34, T1/T2, T2/G12, AAG/T2, T2/G23, BFL/T3, T4/T3, T1/G34, ALT/G34, BFL/AAG, T2/G34, G34/G12, ALT/T3, T3/G34, BFL/T4, ALT/G23, ALT/T2, T4/G23, and T4/G12 of the present embodiment.

The distance from the object-side surface 411 of the first lens element 410 to the image plane 460 along the optical axis is 2.967 mm and the image height of the optical imaging lens 4 is 1.507 mm. Therefore, the length of the optical imaging lens 4 is shortened compared with conventional optical imaging lenses.

FIG. 19(a) shows the longitudinal spherical aberration. From the vertical deviation of each curve shown in FIG. 19(a), the offset of the off-axis light relative to the image point is within ±0.02 mm. Furthermore, the three curves having different wavelengths are closed to each other, and this situation represents that off-axis light with respect to these wavelengths is focused around an image point, and the aberration can be improved obviously.

FIGS. 19(b) and 19(c) respectively show the astigmatism aberration in the sagittal direction and astigmatism aberration in the tangential direction. Referring to FIG. 15(b), the focus variation with respect to the three different wavelengths (470 nm, 555 nm, 650 nm) in the whole field falls within ±0.15 mm. Referring to FIG. 19(c), the focus variation with respect to the three different wavelengths (470 nm, 555 nm, 650 nm) in the whole field falls within ±0.4 mm. Additionally, the three curves presenting different wavelengths are closed to each other, and these closed curves represents that the dispersion is improved.

Please refer to FIG. 19(d), the variation of the distortion aberration of the optical imaging lens 4 is within ±1.2%.

Therefore, the optical imaging lens 4 of the present embodiment shows great characteristics in the longitudinal spherical aberration, astigmatism in the sagittal direction, astigmatism in the tangential direction, and distortion aberration. According to above illustration, the optical imaging lens 4 of the example embodiment indeed achieves great optical performance and the length of the optical imaging lens 4 is effectively shortened.

Figure 22:
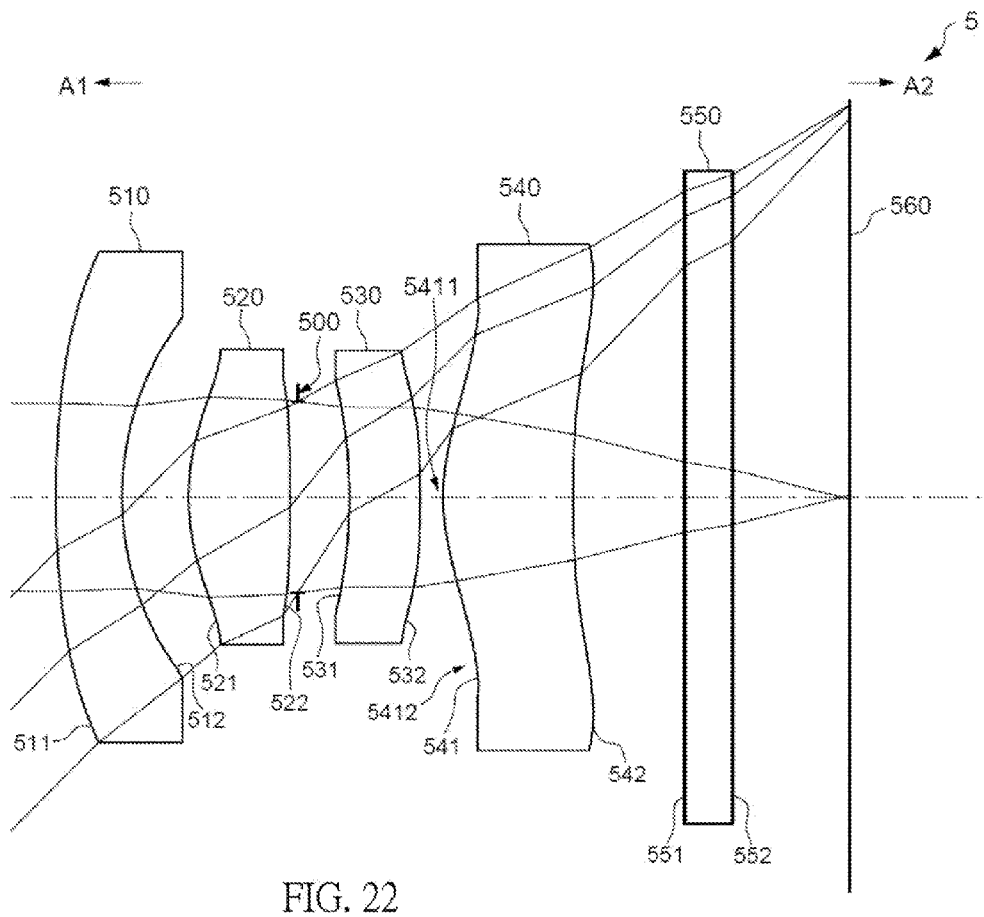
FIG. 22 is a cross-sectional view of a fifth embodiment of an optical imaging lens having six lens elements according to the present disclosure.
Figure 23:
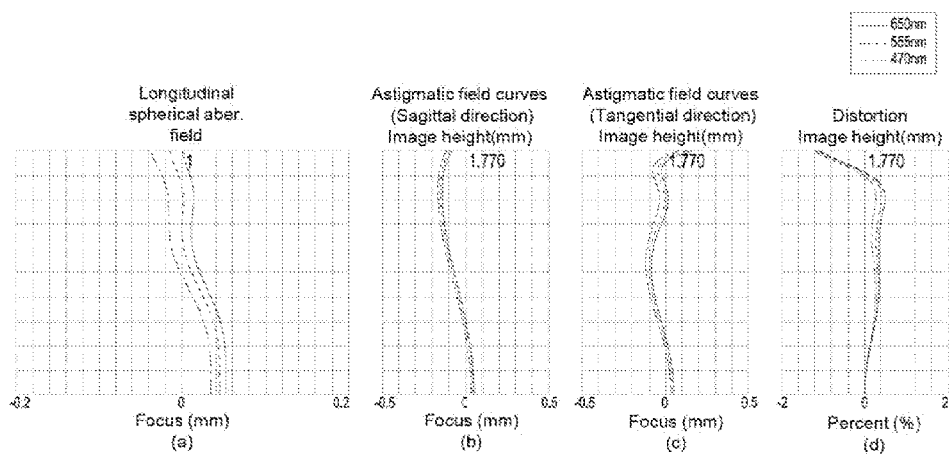
FIG. 23 is a chart of longitudinal spherical aberration and other kinds of optical aberrations of a fifth embodiment of the optical imaging lens according the present disclosure.

Reference is now made to FIGS. 22-25. FIG. 22 illustrates an example cross-sectional view of an optical imaging lens 5 having four lens elements of the optical imaging lens according to a fifth example embodiment. FIG. 23 shows example charts of longitudinal spherical aberration and other kinds of optical aberrations of the optical imaging lens 5 according to the fifth embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 22, the optical imaging lens 5 of the present embodiment, in an order from an object side A1 to an image side A2 along an optical axis, comprises a first lens element 510, a second lens element 520, an aperture stop 500, a third lens element 530, and a fourth lens element 540.

The configuration of the positive/negative refracting power of the first, second, third, and fourth lens elements 510, 520, 530, 540 and configuration of the concave/convex shape of surfaces comprising the object-side surfaces 511, 521, 531 facing to the object side A1 and the image-side surfaces 512, 522, 532, 542 facing to the image side A2, are similar to those in the first embodiment. The differences between the fifth embodiment and the first embodiment are the radius of curvature, thickness of each lens element, aspherical parameters of each lens element, the back focal length, and the configuration of the concave/convex shape of the object-side surface 541. t Here, for clearly showing the drawings of the present embodiment, only the surface shapes which are different from that in the first embodiment are labeled. Specifically, the object-side surface 541 of the fourth lens element 540 comprises a convex portion 5411 in a vicinity of the optical axis and a concave portion 5412 in a vicinity of a periphery of the fourth lens element 540.

FIG. 24 depicts the optical characteristics of each lens elements in the optical imaging lens 5 of the present embodiment, and please refer to FIG. 38 for the values of BFL/G34, T1/T2, T2/G12, AAG/T2, T2/G23, BFL/T3, T4/T3, T1/G34, ALT/G34, BFL/AAG, T2/G34, G34/G12, ALT/T3, T3/G34, BFL/T4, ALT/G23, ALT/T2, T4/G23, and T4/G12 of the present embodiment.

The distance from the object-side surface 511 of the first lens element 510 to the image plane 560 along the optical axis is 3.495 mm and the image height of the optical imaging lens 5 is 1.770 mm. Therefore, the length of the optical imaging lens 5 is shortened compared with conventional optical imaging lenses.

FIG. 23(a) shows the longitudinal spherical aberration of the first embodiment. From the vertical deviation of each curve shown in FIG. 23(a), the offset of the off-axis light relative to the image point is within ±0.06 mm. Furthermore, the three curves having different wavelengths are closed to each other, and this situation represents that off-axis light with respect to these wavelengths is focused around an image point, and the aberration can be improved obviously.

FIGS. 23(b) and 23(c) respectively show the astigmatism aberration in the sagittal direction and astigmatism aberration in the tangential direction. Referring to FIG. 23(b), the focus variation with respect to the three different wavelengths (470 nm, 555 nm, 650 nm) in the whole field falls within ±0.2 mm. Referring to FIG. 23(c), the focus variation with respect to the three different wavelengths (470 nm, 555 nm, 650 nm) in the whole field falls within +0.2 mm. Additionally, the three curves presenting different wavelengths are closed to each other, and these closed curves represents that the dispersion is improved.

Please refer to FIG. 23(d), the variation of the distortion aberration of the optical imaging lens 5 is within ±1.2%.

Therefore, the optical imaging lens 5 of the present embodiment shows great characteristics in the longitudinal spherical aberration, astigmatism in the sagittal direction, astigmatism in the tangential direction, and distortion aberration. According to above illustration, the optical imaging lens 5 of the example embodiment indeed achieves great optical performance and the length of the optical imaging lens 5 is effectively shortened.

Figure 26:
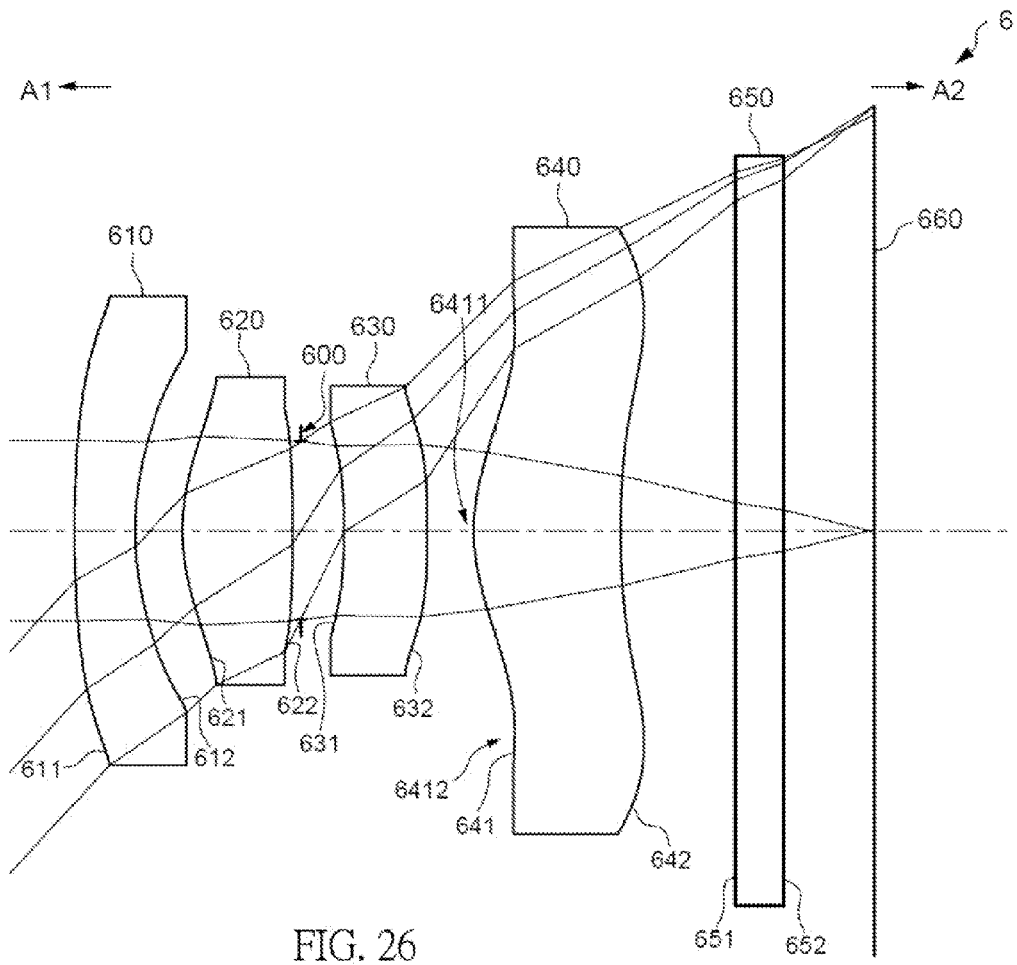
FIG. 26 is a cross-sectional view of a sixth embodiment of an optical imaging lens having six lens elements according to the present disclosure.
Figure 27:
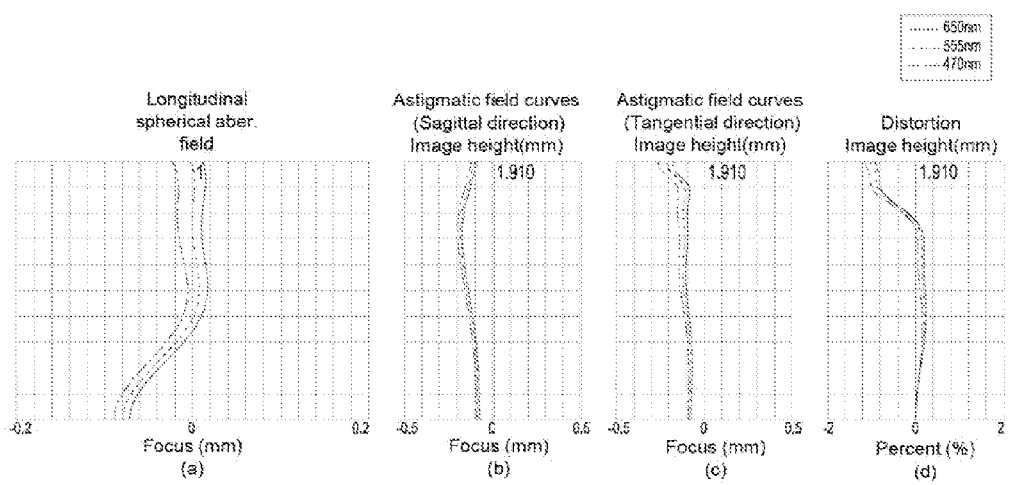
FIG. 27 is a chart of longitudinal spherical aberration and other kinds of optical aberrations of a sixth embodiment of the optical imaging lens according the present disclosure.

Reference is now made to FIGS. 26-29. FIG. 26 illustrates an example cross-sectional view of an optical imaging lens 6 having four lens elements of the optical imaging lens according to a sixth example embodiment. FIG. 27 shows example charts of longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 26, the optical imaging lens 6 of the present embodiment, in an order from an object side A1 to an image side A2 along an optical axis, comprises a first lens element 610, a second lens element 620, an aperture stop 600, a third lens element 630, and a fourth lens element 640. The differences between the sixth embodiment and the first embodiment are the radius of curvature, thickness of each lens element, aspherical parameters of each lens element, the back focal length, and the configuration of the concave/convex shape of the object-side surface 641, but the configuration of the positive/negative refracting power of the first, second, third, and fourth lens elements 610, 620, 630, 640 and configuration of the concave/convex shape of surfaces, comprising the object-side surfaces 611, 621, 631 facing to the object side A1 and the image-side surfaces 612, 622, 632, 642 facing to the image side A2, are similar to those in the first embodiment. Here, for clearly showing the drawings of the present embodiment, only the surface shapes which are different from that in the first embodiment are labeled. Specifically, the object-side surface 641 of the fourth lens element 640 comprises a convex portion 6411 in a vicinity of the optical axis and a concave portion 6412 in a vicinity of a periphery of the fourth lens element 640.

FIG. 28 depicts the optical characteristics of each lens elements in the optical imaging lens 6 of the present embodiment, and please refer to FIG. 38 for the values of BFL/G34, T1/T2, T2/G12, AAG/T2, T2/G23, BFL/T3, T4/T3, T1/G34, ALT/G34, BFL/AAG, T2/G34, G34/G12, ALT/T3, T3/G34, BFL/T4, ALT/G23, ALT/T2, T4/G23, and T4/G12 of the present embodiment.

The distance from the object-side surface 611 of the first lens element 610 to the image plane 660 along the optical axis is 3.499 mm and the image height of the optical imaging lens 6 is 1.910 mm. Therefore, the length of the optical imaging lens 6 is shortened compared with conventional optical imaging lenses.

FIG. 27(a) shows the longitudinal spherical aberration. From the vertical deviation of each curve shown in FIG. 27(a), the offset of the off-axis light relative to the image point is within ±0.1 mm. Furthermore, the three curves having different wavelengths are closed to each other, and this situation represents that off-axis light with respect to these wavelengths is focused around an image point, and the aberration can be improved obviously.

FIGS. 27(b) and 27(c) respectively show the astigmatism aberration in the sagittal direction and astigmatism aberration in the tangential direction. Referring to FIG. 27(b), the focus variation with respect to the three different wavelengths (470 nm, 555 nm, 650 nm) in the whole field falls within ±0.2 mm. Referring to FIG. 27(c), the focus variation with respect to the three different wavelengths (470 nm, 555 nm, 650 nm) in the whole field falls within ±0.3 mm. Additionally, the three curves presenting different wavelengths are closed to each other, and these closed curves represents that the dispersion is improved.

Please refer to FIG. 27(d), the variation of the distortion aberration of the optical imaging lens 6 is within ±1.2%.

Therefore, the optical imaging lens 6 of the present embodiment shows great characteristics in the longitudinal spherical aberration, astigmatism in the sagittal direction, astigmatism in the tangential direction, and distortion aberration. According to above illustration, the optical imaging lens 6 of the example embodiment indeed achieves great optical performance and the length of the optical imaging lens 6 is effectively shortened.

Figure 30:
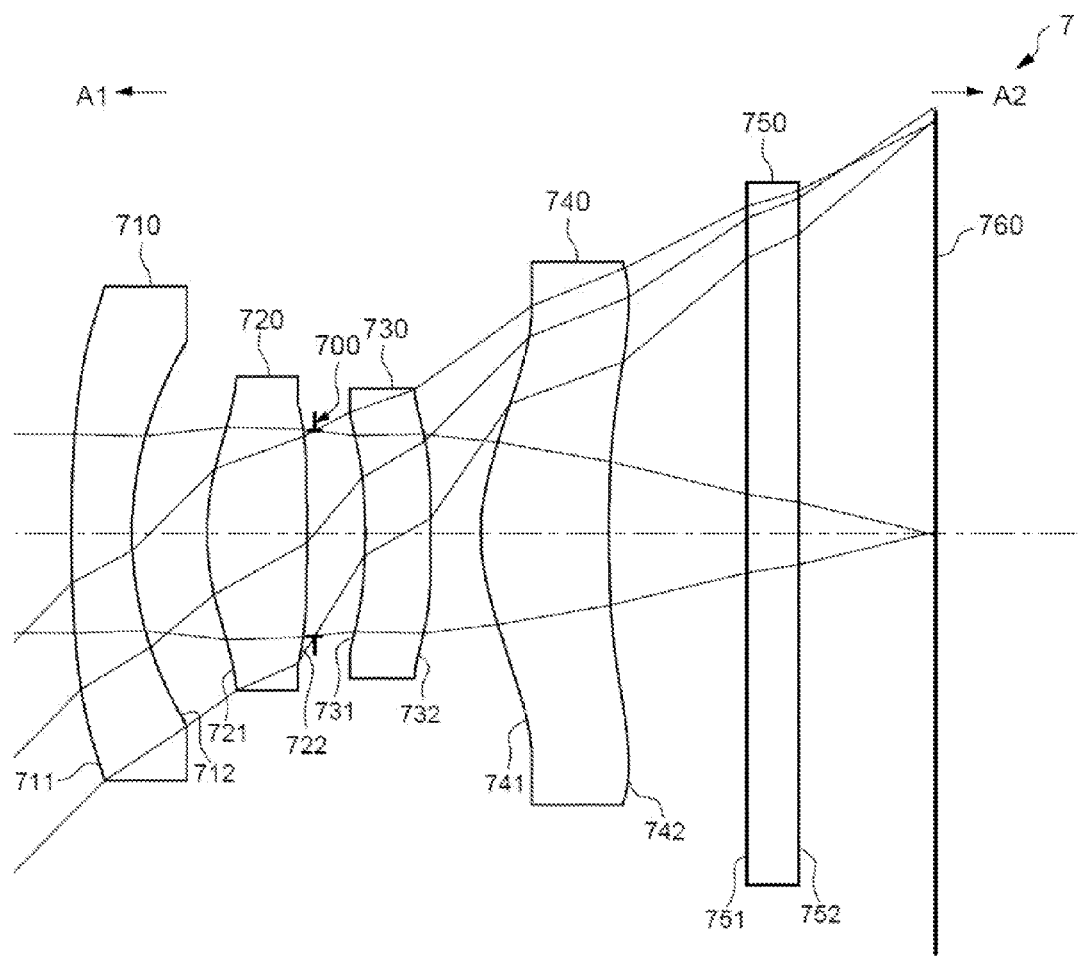
FIG. 30 is a cross-sectional view of a seventh embodiment of an optical imaging lens having six lens elements according to the present disclosure.
Figure 31:
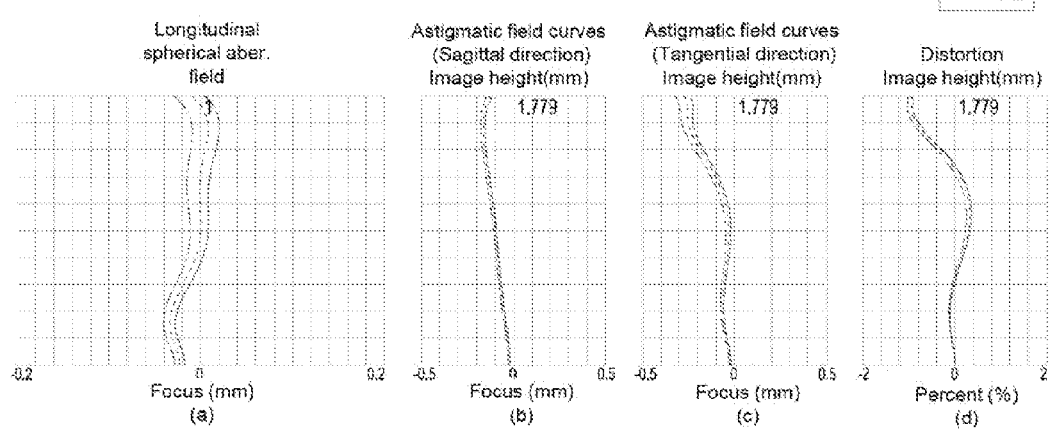
FIG. 31 is a chart of longitudinal spherical aberration and other kinds of optical aberrations of a seventh embodiment of the optical imaging lens according to the present disclosure.

Reference is now made to FIGS. 30-33. FIG. 30 illustrates an example cross-sectional view of an optical imaging lens 7 having four lens elements of the optical imaging lens according to a seventh example embodiment. FIG. 31 shows example charts of longitudinal spherical aberration and other kinds of optical aberrations of the optical imaging lens 7 according to the seventh embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 30, the optical imaging lens 7 of the present embodiment, in an order from an object side A1 to an image side A2 along an optical axis, comprises a first lens element 710, a second lens element 720, an aperture stop 700, a third lens element 730, and a fourth lens element 740.

The differences between the seventh embodiment and the first embodiment are the radius of curvature, thickness of each lens element, aspherical parameters of each lens element, and the back focal length, but the configuration of the positive/negative refracting power of the first, second, third, and fourth lens elements 710, 720, 730, 740 and configuration of the concave/convex shape of surfaces, comprising the object-side surfaces 711, 721, 731, 741 facing to the object side A1 and the image-side surfaces 712, 722, 732, 742 facing to the image side A2, are similar to those in the first embodiment. Here, for clearly showing the drawings of the present embodiment, only the surface shapes which are different from that in the first embodiment are labeled.

FIG. 32 depicts the optical characteristics of each lens elements in the optical imaging lens 1 of the present embodiment, and please refer to FIG. 38 for the values of BFL/G34, T1/T2, T2/G12, AAG/T2, T2/G23, BFL/T3, T4/T3, T1/G34, ALT/G34, BFL/AAG, T2/G34, G34/G12, ALT/T3, T3/G34, BFL/T4, ALT/G23, ALT/T2, T4/G23, and T4/G12 of the present embodiment.

The distance from the object-side surface 711 of the first lens element 710 to the image plane 760 along the optical axis is 3.503 mm and the image height of the optical imaging lens 7 is 1.779 mm. Therefore, the length of the optical imaging lens 7 is shortened compared with conventional optical imaging lenses.

FIG. 31(a) shows the longitudinal spherical aberration. From the vertical deviation of each curve shown in FIG. 31(a), the offset of the off-axis light relative to the image point is within ±0.04 mm. Furthermore, the three curves having different wavelengths are closed to each other, and this situation represents that off-axis light with respect to these wavelengths is focused around an image point, and the aberration can be improved obviously.

FIGS. 31(b) and 31(c) respectively show the astigmatism aberration in the sagittal direction and astigmatism aberration in the tangential direction. Referring to FIG. 31(b), the focus variation with respect to the three different wavelengths (470 nm, 555 nm, 650 nm) in the whole field falls within ±0.2 mm. Referring to FIG. 31(c), the focus variation with respect to the three different wavelengths (470 nm, 555 nm, 650 nm) in the whole field falls within ±0.35 mm. Additionally, the three curves presenting different wavelengths are closed to each other, and these closed curves represents that the dispersion is improved.

Please refer to FIG. 31(d), the variation of the distortion aberration of the optical imaging lens 7 is within +1.2%.

Therefore, the optical imaging lens 7 of the present embodiment shows great characteristics in the longitudinal spherical aberration, astigmatism in the sagittal direction, astigmatism in the tangential direction, and distortion aberration. According to above illustration, the optical imaging lens 7 of the example embodiment indeed achieves great optical performance and the length of the optical imaging lens 7 is effectively shortened.

Figure 34:
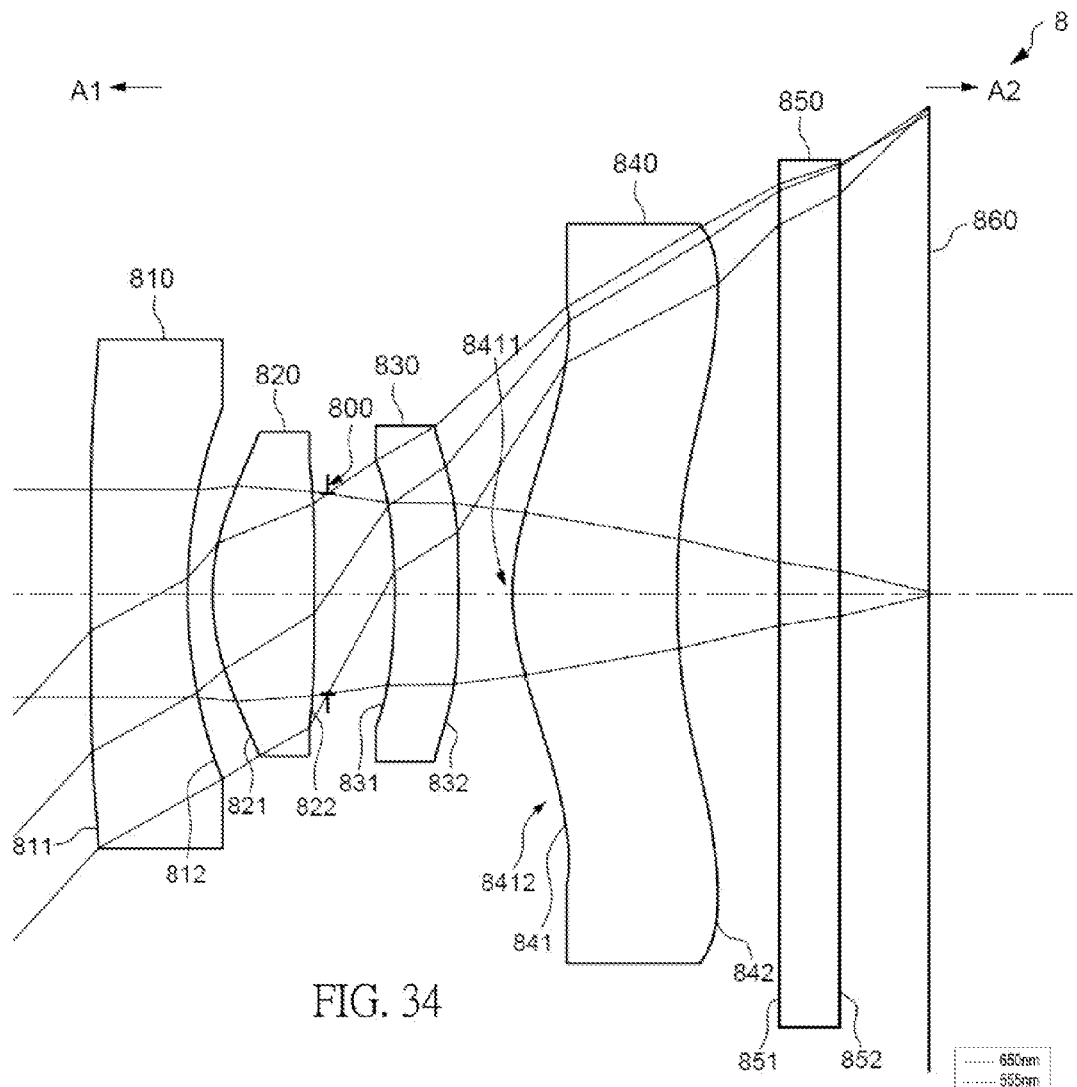
FIG. 34 is a cross-sectional view of a eighth embodiment of an optical imaging lens having six lens elements according to the present disclosure.
Figure 35:
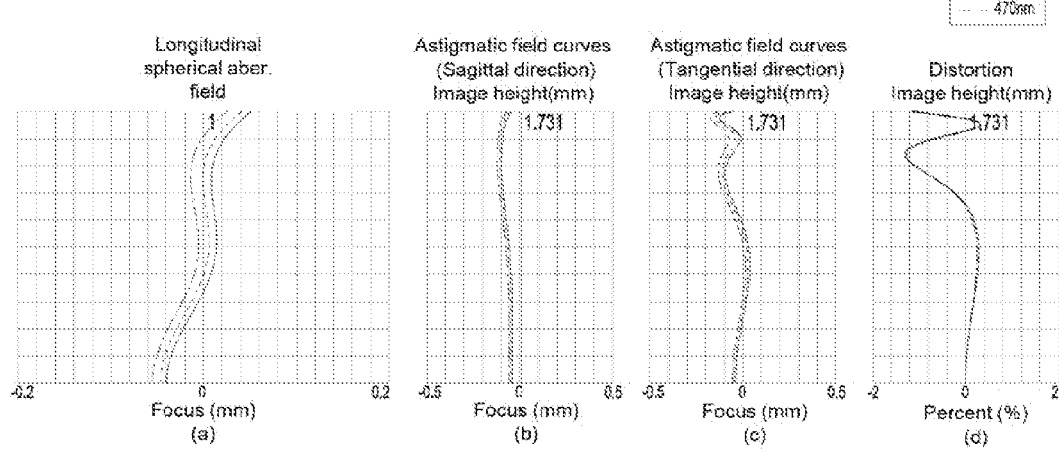
FIG. 35 is a chart of longitudinal spherical aberration and other kinds of optical aberrations of a eighth embodiment of the optical imaging lens according to the present disclosure.

Reference is now made to FIGS. 34-37. FIG. 34 illustrates an example cross-sectional view of an optical imaging lens 8 having four lens elements of the optical imaging lens according to an eighth example embodiment. FIG. 35 shows example charts of longitudinal spherical aberration and other kinds of optical aberrations of the optical imaging lens 8 according to the eighth embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 34, the optical imaging lens 8 of the present embodiment, in an order from an object side A1 to an image side A2 along an optical axis, comprises a first lens element 810, a second lens element 820, an aperture stop 800, a third lens element 830, and a fourth lens element 840.

The differences between the eighth embodiment and the first embodiment are the radius of curvature, thickness of each lens element, aspherical parameters of each lens element, the back focal length, and the configuration of the concave/convex shape of the object-side surface 841, but the configuration of the positive/negative refracting power of the first, second, third, and fourth lens elements 810, 820, 830, 840 and configuration of the concave/convex shape of surfaces, comprising the object-side surfaces 811, 821, 831 facing to the object side A1 and the image-side surfaces, 812, 822, 832, 842 facing to the image side A2, are similar to those in the first embodiment. Here, for clearly showing the drawings of the present embodiment, only the surface shapes which are different from that in the first embodiment are labeled. Specifically, the object-side surface 841 of the fourth lens element 840 comprises a convex portion 8121 in a vicinity of the optical axis and a concave portion 8412 in a vicinity of a periphery of the fourth lens element 840.

FIG. 36 depicts the optical characteristics of each lens elements in the optical imaging lens 8 of the present embodiment, and please refer to FIG. 38 for the values of BFL/G34, T1/T2, T2/G12, AAG/T2, T2/G23, BFL/T3, T4/T3, T1/G34, ALT/G34, BFL/AAG, T2/G34, G34/G12, ALT/T3, T3/G34, BFL/T4, ALT/G23, ALT/T2, T4/G23, and T4/G12 of the present embodiment.

The distance from the object-side surface 811 of the first lens element 810 to the image plane 860 along the optical axis is 2.917 mm and the image height of the optical imaging lens 8 is 1.731 mm. Therefore, the length of the optical imaging lens 8 is shortened compared with conventional optical imaging lenses. Thus, the optical imaging lens 8 is capable to provide excellent imaging quality for smaller sized mobile devices.

FIG. 35(a) shows the longitudinal spherical aberration. From the vertical deviation of each curve shown in FIG. 35(a), the offset of the off-axis light relative to the image point is within ±0.06 mm. Furthermore, the three curves having different wavelengths are closed to each other, and this situation represents that off-axis light with respect to these wavelengths is focused around an image point, and the aberration can be improved obviously.

FIGS. 35(b) and 35(c) respectively show the astigmatism aberration in the sagittal direction and astigmatism aberration in the tangential direction. Referring to FIG. 35(b), the focus variation with respect to the three different wavelengths (470 nm, 555 nm, 650 nm) in the whole field falls within ±0.15 mm. Referring to FIG. 35(c), the focus variation with respect to the three different wavelengths (470 nm, 555 nm, 650 nm) in the whole field falls within +0.2 mm. Additionally, the three curves presenting different wavelengths are closed to each other, and these closed curves represents that the dispersion is improved.

Please refer to FIG. 35(d), the variation of the distortion aberration of the optical imaging lens 8 is within ±1.4%.

Therefore, the optical imaging lens 8 of the present embodiment shows great characteristics in the longitudinal spherical aberration, astigmatism in the sagittal direction, astigmatism in the tangential direction, and distortion aberration. According to above illustration, the optical imaging lens 8 of the example embodiment indeed achieves great optical performance and the length of the optical imaging lens 8 is effectively shortened.

Please refer to FIG. 38 for the values of BFL/G34, T1/T2, T2/G12, AAG/T2, T2/G23, BFL/T3, T4/T3, T1/G34, ALT/G34, BFL/AAG, T2/G34, G34/G12, ALT/T3, T3/G34, BFL/T4, ALT/G23, ALT/T2, T4/G23, and T4/G12 of all nine embodiments, and it is clear that the optical imaging lens of the present invention satisfy the Equations (1)~(19).

Figure 39:
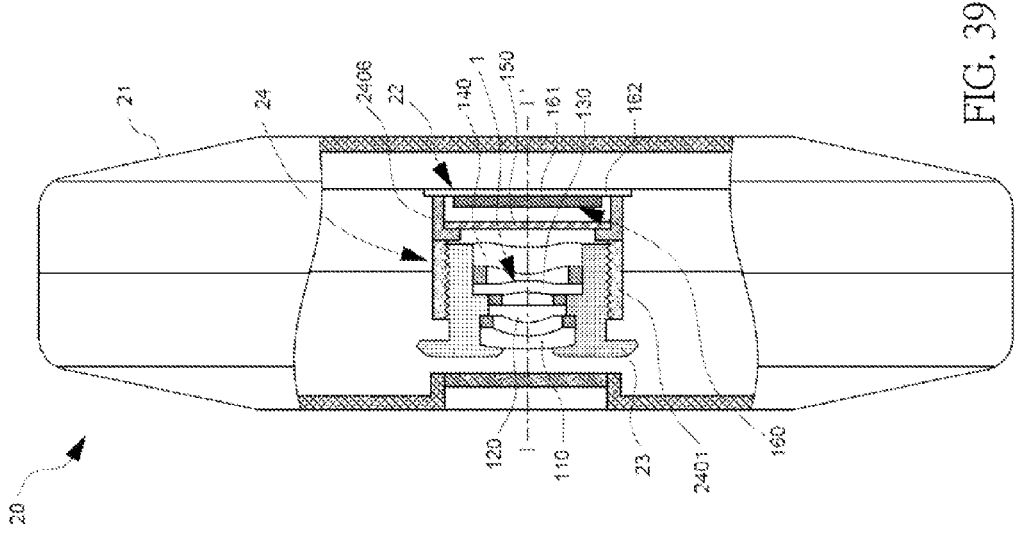
FIG. 39 is a structure of an example embodiment of a mobile device.

Reference is now made to FIG. 39, which illustrates an example structural view of a first embodiment of mobile device 20 applying an aforesaid optical imaging lens. The mobile device 20 comprises a housing 21 and a photography module 22 positioned in the housing 21. Examples of the mobile device 20 may be, but are not limited to, a mobile phone, a camera, a tablet computer, a personal digital assistant (PDA), etc.

As shown in FIG. 39, the photography module 22 has an optical imaging lens with fixed focal length, wherein the photography module 22 may comprise the aforesaid optical imaging lens with six lens elements. For example, photography module 22 comprises the optical imaging lens 1 of the first embodiment, a lens barrel 23 for positioning the optical imaging lens 1, a module housing unit 24 for positioning the lens barrel 23, a substrate 162 for positioning the module housing unit 24, and an image sensor 161 which is positioned at an image side of the optical imaging lens 1. The image plane 160 is formed on the image sensor 161.

In some other example embodiments, the structure of the filtering unit 150 may be omitted. In some example embodiments, the housing 21, the lens barrel 23, and/or the module housing unit 24 may be integrated into a single component or assembled by multiple components. In some example embodiments, the image sensor 161 used in the present embodiment is directly attached to a substrate 162 in the form of a chip on board (COB) package, and such package is different from traditional chip scale packages (CSP) since COB package does not require a cover glass before the image sensor 161 in the optical imaging lens 1. Aforesaid exemplary embodiments are not limited to this package type and could be selectively incorporated in other described embodiments.

The four lens elements 110, 120, 130, 140 are positioned in the lens barrel 23 in the way of separated by an air gap between any two adjacent lens elements.

The module housing unit 24 comprises a lens backseat 2401 for positioning the lens barrel 23 and an image sensor base 2406 positioned between the lens backseat 2401 and the image sensor 161. The lens barrel 23 and the lens backseat 2401 are positioned along a same axis I-I', and the lens backseat 2401 is positioned at the inside of the lens barrel 23. The image sensor base 2406 is exemplarily close to the lens backseat 2401 here. The image sensor base 2406 could be optionally omitted in some other embodiments of the present invention.

Because the length of the optical imaging lens 1 is merely 3.068 mm, the size of the mobile device 20 may be quite small. Therefore, the embodiments described herein meet the market demand for smaller sized product designs.

Figure 40:
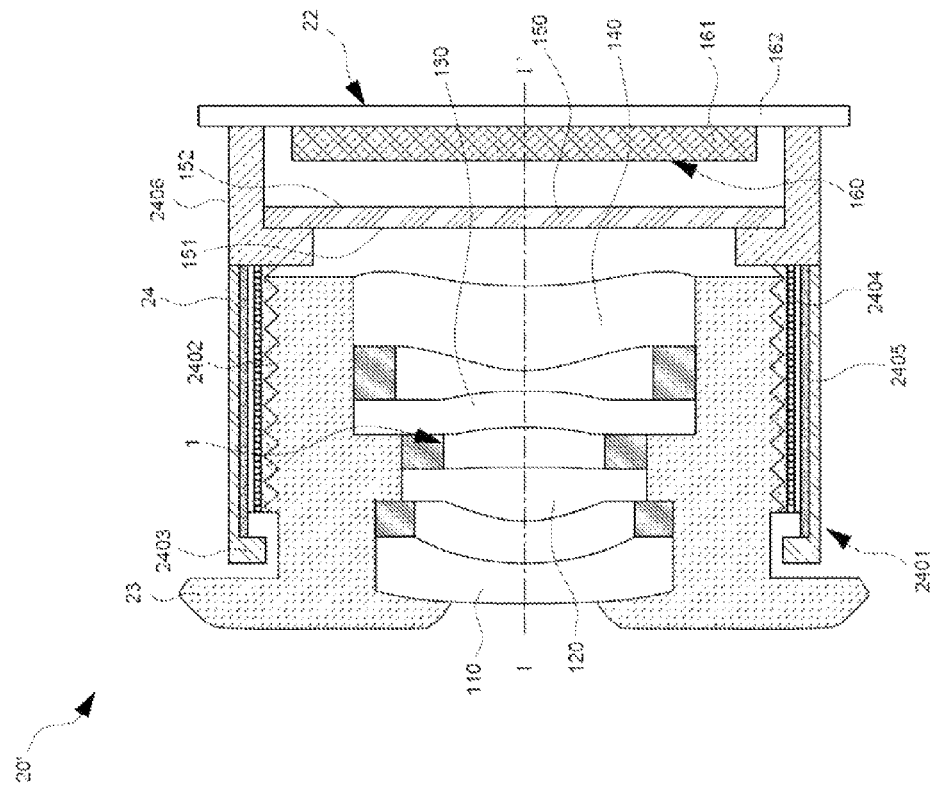
FIG. 40 is a partially enlarged view of the structure of another example embodiment of a mobile device.

Reference is now made to FIG. 40, which shows another structural view of a second embodiment of mobile device 20' applying the aforesaid optical imaging lens 1. One difference between the mobile device 20' and the mobile device 20 may be the lens backseat 2401 comprising a first seat unit 2402, a second seat unit 2403, a coil 2404 and a magnetic unit 2405. The first seat unit 2402 is close to the outside of the lens barrel 23, and positioned along an axis I-I', and the second seat unit 2403 is around the outside of the first seat unit 2402 and positioned along with the axis I-I'. The coil 2404 is positioned between the outside of the first seat unit 2402 and the inside of the second seat unit 2403. The magnetic unit 2405 is positioned between the outside of the coil 2404 and the inside of the second seat unit 2403.

The lens barrel 23 and the optical imaging lens 1 positioned therein are driven by the first seat unit 2402 for moving along the axis I-I'. The rest structure of the mobile device 20' is similar to the mobile device 20.

Similarly, because the length of the optical imaging lens 1 is 3.068 mm, is shortened, the mobile device 20' may be designed with a smaller size and meanwhile good optical performance is still provided. Therefore, the present embodiment meets the demand of small sized product design and the request of the market.

According to above illustration, it is clear that the mobile device and the optical imaging lens thereof in example embodiments, through controlling the detail structure of the lens elements and an inequality, the length of the optical imaging lens is effectively shortened and meanwhile good optical characteristics are still provided.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising first, second, third, and fourth lens elements, each of said first, second, third, and fourth lens elements having refracting power, an object-side surface facing toward the object side, an image-side surface facing toward the image side, and a central thickness defined along an optical axis, wherein:

said first lens element has negative refracting power, said object-side surface of said first lens element comprises a convex portion in a vicinity of a periphery of the-first lens element, said image-side surface of said first lens element comprises a concave portion in a vicinity of the optical axis and a concave portion in a vicinity of a periphery of the-first lens element;

said second lens element has positive refracting power, said object-side surface of said second lens element comprises a convex portion in a vicinity of the optical axis and a convex portion in a vicinity of a periphery of the second lens element;

said third lens element has negative refracting power, said object-side surface of said third lens element comprises a concave portion in a vicinity of the optical axis and a concave portion in a vicinity of a periphery of the third lens element, said image-side surface of said third lens element comprises a convex portion in a vicinity of the optical axis and a convex portion in a vicinity of a periphery of the third lens element;

said fourth lens element has positive refracting power, said object-side surface of said fourth lens element comprises a convex portion in a vicinity of the optical axis, said image-side surface of said fourth lens element comprises a concave portion in a vicinity of the optical axis;

a back focal length of the optical imaging lens, which is defined as the distance from the image-side surface of the fourth lens element to an image plane along the optical axis, is represented by BFL, an air gap between the third lens element and the fourth lens element along the optical axis is represented by G34, a central thickness of the third lens element is represented by T3, and T3, BFL and G34 satisfy the equations: $BFL/G34 \leq 13.0$ and $BFL/T3 \leq 5.0$;

the optical imaging lens comprises no other lenses having refracting power beyond the four lens elements.

2. The optical imaging lens according to claim 1, wherein a central thickness of the first lens element is represented by T1, a central thickness of the second lens element is represented by T2, and T1 and T2 satisfy the equation: $T1/T2 \leq 1.6$.

3. The optical imaging lens according to claim 2, wherein an air gap between the first lens element and the second lens element along the optical axis is represented by G12, and G34, G12, satisfy the equation: $G34/G12 \leq 2.2$.

4. The optical imaging lens according to claim 1, wherein a central thickness of the second lens element is represented by T2, an air gap between the first lens element and the second lens element along the optical axis is represented by G12, T2 and G12 satisfy the equation: $1.2 \leq T2/G12$.

5. The optical imaging lens according to claim 4, wherein a central thickness of the first lens element is represented by T1, a central thickness of the fourth lens element is represented by T4, a sum of T1, T2, T3, and T4 is represented by ALT, and ALT and T3 satisfy the equation: $ALT/T3 \leq 10.0$.

6. The optical imaging lens according to claim 1, wherein a sum of all three air gaps from the first lens element to the four lens element along the optical axis is represented by AAG, a central thickness of the second lens element is represented by T2, and AAG and T2 satisfy the equation: $AAG/T2 \leq 2.0$.

7. The optical imaging lens according to claim 6, wherein T3 and G34 satisfy the equation: $1.0 \leq T3/G34$.

8. The optical imaging lens according to claim 1, wherein a central thickness of the second lens element is represented by T2, an air gap between the second lens element and the third lens element along the optical axis is represented by G23, and T2 and G23 satisfy the equation: $1.0 \leq T2/G23$.

9. The optical imaging lens according to claim 8, wherein a central thickness of the fourth lens element is represented by T4, and BFL and T4 satisfy the equation: $1.0 \leq BFL/T4$.

10. The optical imaging lens according to claim 1, wherein a central thickness of the first lens element is represented by T1, a central thickness of the second lens element is represented by T2, a central thickness of the fourth lens element is represented by T4, a sum of T1, T2, T3, and T4 is represented by ALT, and ALT and G23 satisfy the equation: $4.5 \leq ALT/G23$.

11. The optical imaging lens according to claim 1, wherein a central thickness of the fourth lens element is represented by T4, T3 and T4 satisfy the equation: $T3/T4 \leq 3.5$.

12. The optical imaging lens according to claim 11, wherein a central thickness of the first lens element is represented by T1, a central thickness of the second lens element is represented by T2, a sum of T1, T2, T3, and T4 is represented by ALT, and ALT and T2 satisfy the equation: $ALT/T2 \leq 5.0$.

13. The optical imaging lens according to claim 1, wherein a central thickness of the first lens element is represented by T1, and T1 and G34 satisfy the equation: $1.2 \leq T1/G34$.

14. The optical imaging lens according to claim 13, wherein a central thickness of the fourth lens element is represented by T4, an air gap between the second lens element and the third lens element along the optical axis is represented by G23, and T4 and G23 satisfy the equation: $1.5 \leq T4/G23$.

15. The optical imaging lens according to claim 1, wherein a central thickness of the first lens element is represented by T1, a central thickness of the second lens element is represented by T2, a central thickness of the fourth lens element is represented by T4, a sum of T1, T2, T3, and T4 is represented by ALT, and ALT and G34 satisfy the equation: $7.0 \leq ALT/G34$.

16. The optical imaging lens according to claim 15, wherein a central thickness of the first lens element is represented by T1, and T1 and G34 satisfy the equation: $1.6 \leq T1/G34$.

17. The optical imaging lens according to claim 1, wherein an air gap between the first lens element and the second lens element along the optical axis is represented by G12, an air gap between the second lens element and the third lens element along the optical axis is represented by G23, a sum of G12, G23, and G34 is represented by AAG, and AAG and BFL satisfy the equation: $1.2 \leq BFL/AAG$.

18. The optical imaging lens according to claim 1, wherein a central thickness of the fourth lens element is represented by T4, T4 and G34 satisfy the equation: $2.2 \leq T4/G34$.

19. A mobile device, comprising:
a housing; and
a photography module positioned in the housing and comprising:
an optical imaging lens according to claim 1;
a lens barrel for positioning the optical imaging lens;
a module housing unit for positioning the lens barrel; and an image sensor positioned at the image side of the optical imaging lens.

* * * * *